(12) United States Patent
Imada et al.

(10) Patent No.: US 11,943,822 B2
(45) Date of Patent: Mar. 26, 2024

(54) COMMUNICATION DEVICE, CONNECTION DESTINATION DETERMINATION METHOD, AND WIRELESS CONNECTION METHOD

(71) Applicant: Sony Interactive Entertainment Inc., Tokyo (JP)

(72) Inventors: Yoshiyuki Imada, Chiba (JP); Masashi Kamata, Komazama (JP); Tai Hirakawa, Saitama (JP)

(73) Assignee: Sony Interactive Entertainment Inc., Tokyo (JP)

( * ) Notice: Subject to any disclaimer, the term of this patent is extended or adjusted under 35 U.S.C. 154(b) by 416 days.

(21) Appl. No.: 17/289,039

(22) PCT Filed: Nov. 8, 2019

(86) PCT No.: PCT/JP2019/044027
§ 371 (c)(1),
(2) Date: Apr. 27, 2021

(87) PCT Pub. No.: WO2020/096068
PCT Pub. Date: May 14, 2020

(65) Prior Publication Data
US 2021/0410202 A1 Dec. 30, 2021

(30) Foreign Application Priority Data
Nov. 9, 2018 (JP) .................... 2018-211195

(51) Int. Cl.
*H04W 76/10* (2018.01)
(52) U.S. Cl.
CPC .................... *H04W 76/10* (2018.02)
(58) Field of Classification Search
CPC ..... H04W 76/10; H04W 28/08; H04W 12/50; H04W 76/15; H04W 76/34; H04W 76/20;
(Continued)

(56) References Cited

U.S. PATENT DOCUMENTS 7,239,615 B2 * 7/2007 Nevo .................... H04W 88/06
370/278
7,620,372 B2 * 11/2009 Miyazaki ............... H04B 1/715
455/66.1
(Continued)

FOREIGN PATENT DOCUMENTS

CN 108227680 A 6/2018
JP 2005142860 A 6/2005
(Continued)

OTHER PUBLICATIONS

Extended European Search Report for corresponding EP Application No. 19881279.4, 7 pages, dated Jul. 22, 2022.
(Continued)

*Primary Examiner* — Man U Phan
(74) *Attorney, Agent, or Firm* — Matthew B. Dernier, Esq.

(57) ABSTRACT

A communication device is configured to wirelessly connect to an electronic apparatus. The communication device comprises a first communication unit and a second communication unit of a same type as that of the first communication unit and a control unit configured to control the first communication unit and the second communication unit. The control unit is configured to acquire a communication situation of the first communication unit with electronic apparatus and another communication situation of the second communication unit with electronic apparatus. The control unit is configured to execute an allocation process for determining a connection destination of an electronic apparatus to the first communication unit or the second communication unit based on the communication situations.

12 Claims, 21 Drawing Sheets

(58) Field of Classification Search
CPC ....... H04W 84/20; H04W 8/00; H04W 84/10; H04W 72/04; H04W 4/80; H04W 40/28; H04W 40/32; H04W 76/02; H04W 48/08; H04W 48/16; H04W 8/26; H04W 88/02; H04B 1/44; H04B 7/005; H04L 7/00; H04L 5/1469; H04L 12/28; G06F 9/48
USPC .......................................................... 370/329
See application file for complete search history.

(56) References Cited

U.S. PATENT DOCUMENTS

| | | | | |
|---|---|---|---|---|
| 7,697,896 | B2* | 4/2010 | Maekawa | H04W 92/02 370/338 |
| 8,107,882 | B2* | 1/2012 | Fischer | H04W 72/1215 455/63.1 |
| 8,180,363 | B2* | 5/2012 | Maekawa | A63F 13/332 455/448 |
| 8,386,658 | B2* | 2/2013 | Lee | H04W 88/02 710/63 |
| 8,423,041 | B2* | 4/2013 | Maekawa | A63F 13/332 455/448 |
| 9,532,302 | B2* | 12/2016 | Ghaboosi | H04W 64/00 |
| 11,606,114 | B2* | 3/2023 | Hirakawa | H04L 5/1469 |
| 2005/0122948 | A1 | 6/2005 | Miyazaki | |
| 2007/0149150 | A1* | 6/2007 | Miyazaki | H04B 1/16 455/88 |
| 2007/0283018 | A1* | 12/2007 | Yun | H04W 76/10 709/227 |
| 2007/0288680 | A1* | 12/2007 | Tominaga | G06F 13/385 710/313 |
| 2013/0297838 | A1* | 11/2013 | Lee | H04W 8/005 710/20 |
| 2014/0286193 | A1* | 9/2014 | Ghaboosi | H04W 8/186 370/254 |
| 2018/0152840 | A1* | 5/2018 | Nagasaki | H04W 48/18 |
| 2020/0364957 | A1 | 11/2020 | Wang | |

FOREIGN PATENT DOCUMENTS

| | | |
|---|---|---|
| JP | 2006295871 A | 10/2006 |
| JP | 2008061034 A | 3/2008 |

OTHER PUBLICATIONS

International Preliminary Report on Patentability and Written Opinion for corresponding PCT Application No. PCT/JP2019/044027, 12 pages, dated May 20, 2021.

International Search Report for corresponding PCT Application No. PCT/JP2019/044027, 4 pages, dated Jan. 28, 2020.

* cited by examiner

COMMUNICATION DEVICE, CONNECTION DESTINATION DETERMINATION METHOD, AND WIRELESS CONNECTION METHOD

TECHNICAL FIELD

The present invention relates to a wireless communication technology.

BACKGROUND ART

PTL 1 discloses a game machine that includes a plurality of communication modules of the same type that wirelessly communicate by a frequency hopping method. A control unit of the game machine determines a hopping frequency channel of at least one communication module such that frequency channels used by a plurality of communication modules may not overlap with each other in time.

CITATION LIST

Patent Literature

[PTL 1] JP 2005-142860A

SUMMARY

Technical Problem

A contrivance that allows users to play a game together while doing voice chat has been proposed. The users are released from the troublesomeness of a cable by using a wireless headset. Further, by incorporating a microphone and a speaker in a wireless game controller for operating a game machine, an environment in which a user can enjoy voice chat without a headset is implemented. By emergence of such electronic apparatus, it is necessary for a game machine to be capable of transmitting and receiving a large amount of data to and from an electronic apparatus and it is necessary to construct a contrivance that manages wireless connection efficiently in the case where a plurality of electronic apparatuses are connected simultaneously.

The object of the present invention resides in provision of a technology relating to a wireless communication device.

Solution to Problem

The present invention is defined by the appended claims.

In order to solve, or at least alleviate, or at least address, the subject described above, according to an example mode of the present invention, there is provided a communication device that is wirelessly connectable to an external apparatus, the communication device comprising: a first communication unit, a second communication unit of a same type as that of the first communication unit, and a control unit configured to control the first communication unit and the second communication unit, wherein the control unit is configured to acquire a communication situation of the first communication unit with external apparatus and another communication situation of the second communication unit with external apparatus, and the control unit is configured to execute an allocation process for determining a connection destination of an external apparatus in a data transfer mode to the first communication unit or the second communication unit based on the communication situations.

According to another example mode of the present invention, there is provided a connection destination determination method for determining a connection destination of an external apparatus in a data transfer mode in a communication device that includes a first communication unit and a second communication unit of a same type as that of the first communication unit, the method comprising: a step of acquiring a communication situation of the first communication unit with an external apparatus and another communication situation of the second communication unit with an external apparatus, and a step of determining a connection destination of an external apparatus in the data transfer mode to the first communication unit or the second communication unit based on the acquired communication situations.

According to a further example mode of the present invention, there is provided a communication device that is wirelessly connectable to an external apparatus, the communication device comprising: a first communication unit, a second communication unit of a same type as that of the first communication unit, and a control unit configured to control the first communication unit and the second communication unit, wherein the control unit is configured to connect one of the first communication unit and the second communication unit to the external apparatus in a data transfer mode in which data can be transferred and connect the other of the first communication unit and the second communication unit to the external apparatus in a data non-transfer mode in which data is not transferred.

According to a further example mode of the present invention, there is provided a method for wirelessly connecting a communication device including a first communication unit and a second communication unit of a same type as that of the first communication unit to an external apparatus, the method comprising: a step of connecting one of the first communication unit and the second communication unit to the external apparatus in a data transfer mode in which data can be transferred, and a step of connecting the other of the first communication unit and the second communication unit to the external apparatus in a data non-transfer mode in which data is not transferred.

It is to be noted that also an arbitrary combination of the components described above and representations of the present invention, which are converted among a method, a device, a system, a computer program, a recording medium on which the computer program is readably recorded, a data structure and so forth, are effective as modes of the present invention.

DESCRIPTION OF EMBODIMENT

Figure 1:
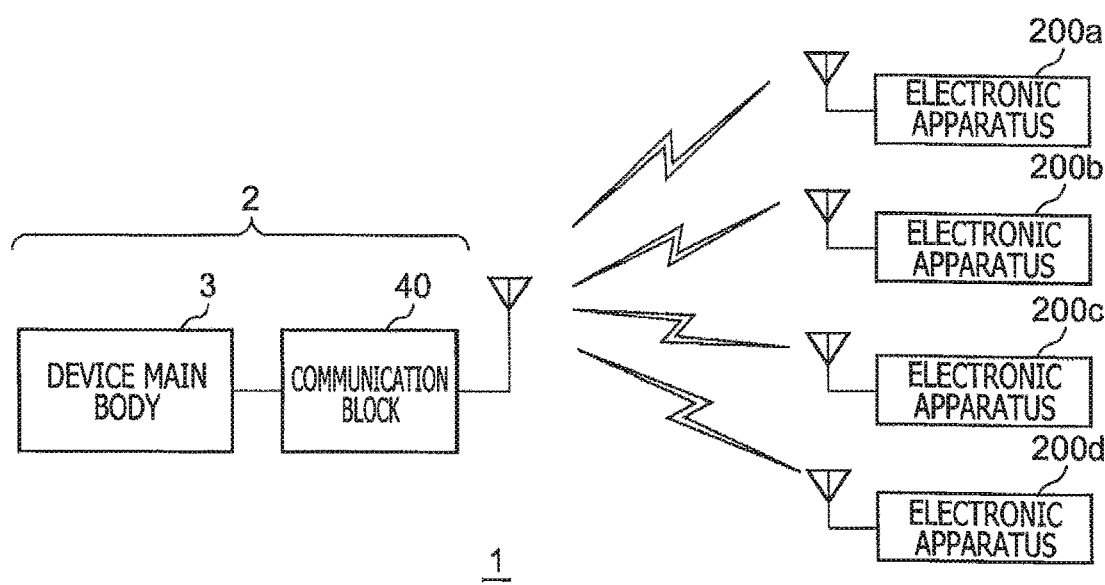
FIG. 1 is a view depicting a communication system of an embodiment.

In the following, a communication system of an embodiment is described. The communication system of the embodiment includes a communication device and at least one electronic apparatus. The communication device and the electronic apparatus wirelessly communicate with each other using the Bluetooth (Bluetooth, registered trademark) protocol that adopts a frequency hopping method. In the case where the communication device is incorporated in a game device, the electronic apparatus that is wirelessly connected to the communication device may be a game device peripheral such as a headset or a game controller that allows a user to perform voice chat. By incorporating the functions of a microphone and a speaker into a game controller, a user can carry out voice chat even without a headset.

The communication device of the embodiment includes a plurality of communication units (transceivers) of the same type. Here, the "same type" may indicate for example that the physical circuitry of the communication units is identical or is at least capable of identical or similar function. It may indicate for example that operating software and/or operating protocols of the communication units are identical. It implies that (a) the communication units can operate according to the same wireless communications protocol(s) (such as, though not exclusively, a Bluetooth® protocol). This allows wireless communications with any given external apparatus to be handled interchangeably by either or any of the communications units.

So, the communications process by the external apparatus is the same or similar, independent of which communications unit forms the other party to such communication such that the external apparatus is equally capable of communication with any of a plurality of such communication units of the same type, for example, by following a common communications protocol in its communication with the communication units of the same type. (Having said this, it is of course noted that there may be aspects of communication with a particular communication unit which are specific to that particular communication operation with that particular communication unit. For example, the communication between the external device and the particular communication unit may potentially specify an identifier (whether paired or on an adhoc basis) of that particular communication unit, or the external apparatus and communication unit may each operate selectively as a master or a slave for that specific communication operation, or the actual data transmitted or received during the particular communication may be specific to the particular communication).

In this way, by providing a plurality of communication units of the same type, the communication device can increase the communication capacity and can wirelessly communicate with many electronic apparatus. The plurality of communication units may be controlled by a single device driver, and data from the plurality of communication units may be handled as data from a single communication unit by the device driver. The device driver connects the communication units and the electronic apparatus suitably on the basis of communication situations of the plurality of communication units. It is to be noted that the communication device of the embodiment may be incorporated in an information processing device of a different type other than a game device.

FIG. 1 depicts a communication system 1 of the embodiment. A communication device 2 includes a device main body 3 and a communication block 40. The communication block 40 includes a plurality of Bluetooth (this may be hereinafter referred to simply as "BT") communication apparatus. The device main body 3 includes a device driver that controls the communication block 40, and data acquired via the communication block 40 is supplied to application software of a game or chat. Electronic apparatuses 200a to 200d (in the case where they are not distinguished from each other, each of them is referred to as "electronic apparatus 200") may be a peripheral such as a headset or a game controller that includes a BT communication apparatus.

Note that the present techniques are not restricted to BT arrangements. Other communications protocols, such as other frequency-hopping protocols (for example non-BT protocols using adaptive frequency hopping spread spectrum or frequency hopping code division multiple access techniques) may be used instead or in addition. The term "communications operations" refers to the use of any such techniques.

The communication block 40 is wirelessly connected to one or more electronic apparatus 200. The device driver incorporated in the device main body 3 efficiently allocates an electronic apparatus 200 to one of the plurality of communication units of the communication block 40 and supports good wireless communication between the communication block 40 and the electronic apparatus 200.

The communication device 2 may comprise a programmable processing unit and therefore provides an example of a computer provided in a communication device that includes a plurality of communication units of the same type. The computer (such as that shown schematically in FIG. 25) can, under the control of a program comprising computer-executable instructions, perform any of the methods or techniques discussed here relating to the operations of such a communication device.

The electronic apparatus 200 may comprise a programmable processing unit and therefore provides an example of a computer which is wirelessly connectable to a communication device that includes a plurality of communication units of the same type. The computer (such as that shown schematically in FIG. 25) can, under the control of a program comprising computer-executable instructions, perform any of the methods or techniques discussed here relating to the operations of such an electronic apparatus.

Figure 2:
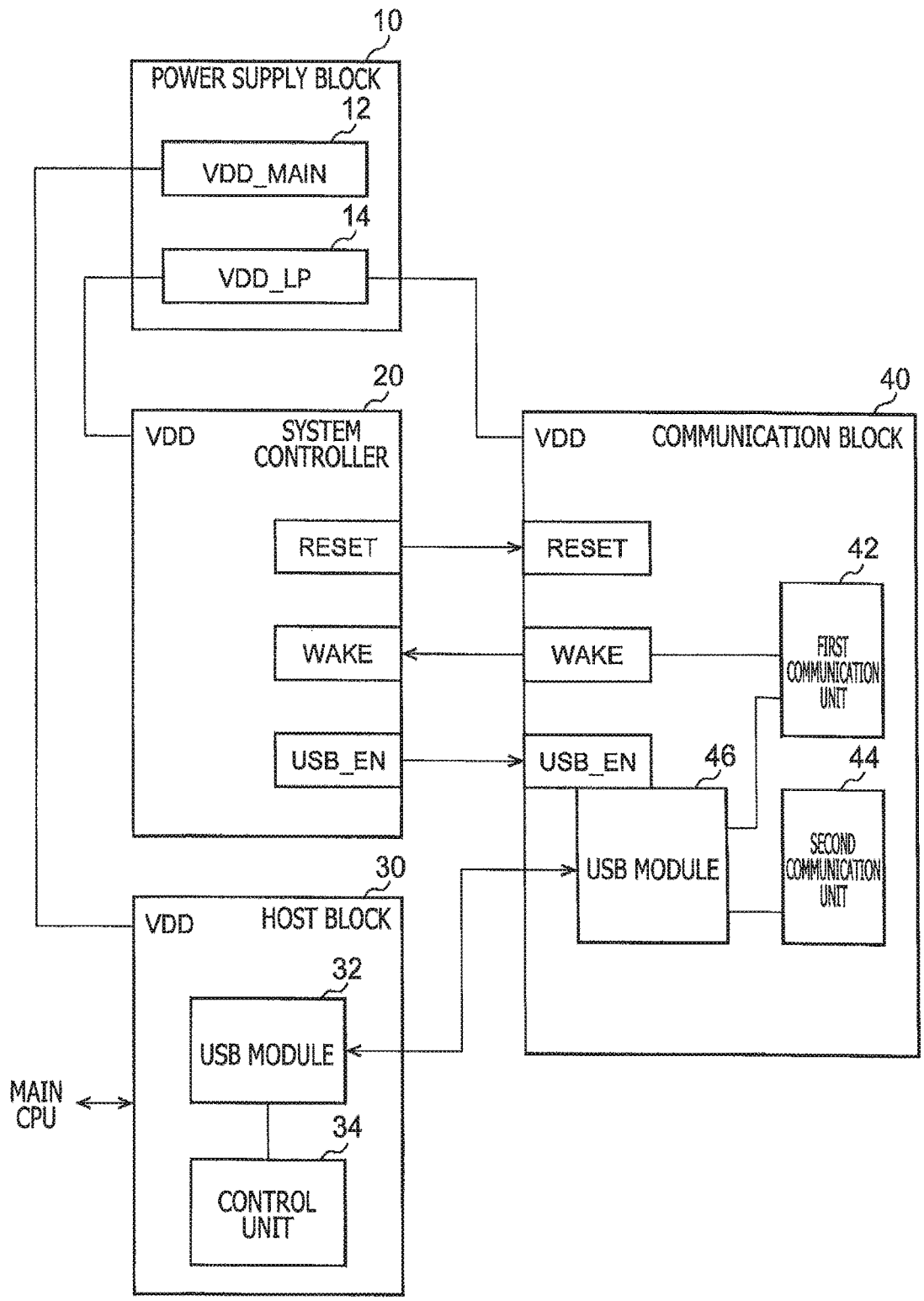
FIG. 2 is a block diagram of part of a communication device.

FIG. 2 is a block diagram of part of the communication device 2 that is wirelessly connected to an external electronic apparatus. The communication device 2 includes a power supply block 10, a system controller 20, a host block 30, and a communication block 40. In the power supply block 10, a VDD_MAIN 12 supplies main power, and a VDD_LP 14 supplies low power. In the example depicted in FIG. 2, the system controller 20 and the communication block 40 are driven by the low power supply and the host block 30 is drive by the main power supply.

The communication block 40 includes a plurality of communication units of the same type and includes, in the embodiment, two communication units of a first communication unit 42 and a second communication unit 44. That the communication units are of the same type may signify that communication standards used by them are same as each other. The communication block 40 may be configured as a system-on-chip and the first communication unit 42 and the second communication unit 44 may operate on the basis of a clock signal of a common system clock oscillator provided on the same chip. The first communication unit 42 and the second communication unit 44 are integrated circuit parts that are individually connected to antennae and have a function for establishing wireless connection to an external electronic apparatus 200 in accordance with the Bluetooth protocol. A universal serial bus (USB) module 32 of the host block 30 and a USB module 46 of the communication block 40 are connected to each other in accordance with a common USB standard. It is to be noted that the host block 30 and the communication block 40 may be connected to each other in accordance with a communication standard other than the USB standard.

The first communication unit 42 and the second communication unit 44 are connected to the single USB module 46. By commonly using the single USB module 46 in the communication block 40, the chip production cost of the communication block 40 can be reduced. A data signal received by the first communication unit 42 and/or the second communication unit 44 is transmitted to the USB module 32 through the USB module 46 and is subjected to necessary processing by a control unit 34 and then provided to a main central processing unit (CPU) (not depicted) that executes an application. Meanwhile, a data signal generated by the main CPU is transmitted to the USB module 46 through the USB module 32 and is transmitted from the first communication unit 42 or the second communication unit 44 to the electronic apparatus 200 to which the first communication unit 42 or the second communication unit 44 is wirelessly connected.

In the following, a state transition of a power supply system in the communication device 2 is described.

<Power Off>

In the case where the power supply cable of the communication device 2 is not connected to an electrical outlet, the communication device 2 is in a power off state.

<BT Initialization>

If the power supply cable of the communication device 2 is connected to the electrical outlet, then the system controller 20 is started. After the system controller 20 is started, it supplies power to the host block 30 and the communication block 40. After the host block 30 is started, the system controller 20 supplies a USB_EN signal for enabling the USB module 46 to the communication block 40. Consequently, the USB module 32 and the USB module 46 are USB connected to each other.

In the host block 30, the control unit 34 operates as a device driver that controls a BT communication apparatus. The control unit 34 downloads firmware to the first communication unit 42 through the USB connection to initialize the first communication unit 42. In this state, the control unit 34 carries out initialization only of one communication unit, namely, the first communication unit 42, determined in advance from among the plurality of communication units of the same type and does not perform initialization of the second communication unit 44. The control unit 34 sets parameters for wake on to the first communication unit 42.

<Wake on BT>

After the control unit 34 sets the parameters for wake on to the first communication unit 42, the system controller 20 stops the power supply to the host block 30 and stops supply of the USB_EN signal. Consequently, in the communication device 2, only the system controller 20 and the first communication unit 42 maintain the started state.

The first communication unit 42 enters a page scan mode for waiting for a connection request from an external electronic apparatus 200. The first communication unit 42 has acquired and retained address information (apparatus identification (ID)) for identifying electronic apparatus 200 to be connected to the communication device 2 by a pairing process in advance. The first communication unit 42 may have acquired and retained address information by predetermined pairing information being encoded in one or both of the electronic apparatus and the communications device, or by using an ad-hoc association between the electronic apparatus and the communications device. The first communication unit 42 reads out, in the page scan mode, a connectable apparatus ID list which includes one or more apparatus IDs and waits for a connection request (paging) from an electronic apparatus 200. In the state of the wake on BT, a connection request from an external electronic apparatus 200 becomes a starting request for the entire communication device including the device main body 3.

If the first communication unit 42 receives a connection request from an electronic apparatus 200 having a BT device address included in the apparatus ID list, then it outputs a WAKE signal to the system controller 20 in accordance with the parameters for wake on. When the system controller 20 receives the WAKE signal, it supplies power to the host block 30 and supplies a USB_EN signal for enabling the USB module 46 to the communication block 40. The control unit 34 downloads firmware to the second communication unit 44 through the USB connection to initialize the second communication unit 44. Consequently, in the communication block 40, the first communication unit 42 and the second communication unit 44 are placed into a state in which they can establish wireless connection to the external electronic apparatus 200.

<Suspend>

In a suspend state, the first communication unit 42 operates in a page scan mode for waiting for a connection request from an external electronic apparatus 200. The USB module 32 and the USB module 46 suspend and the second communication unit 44 sleeps.

Figure 3:
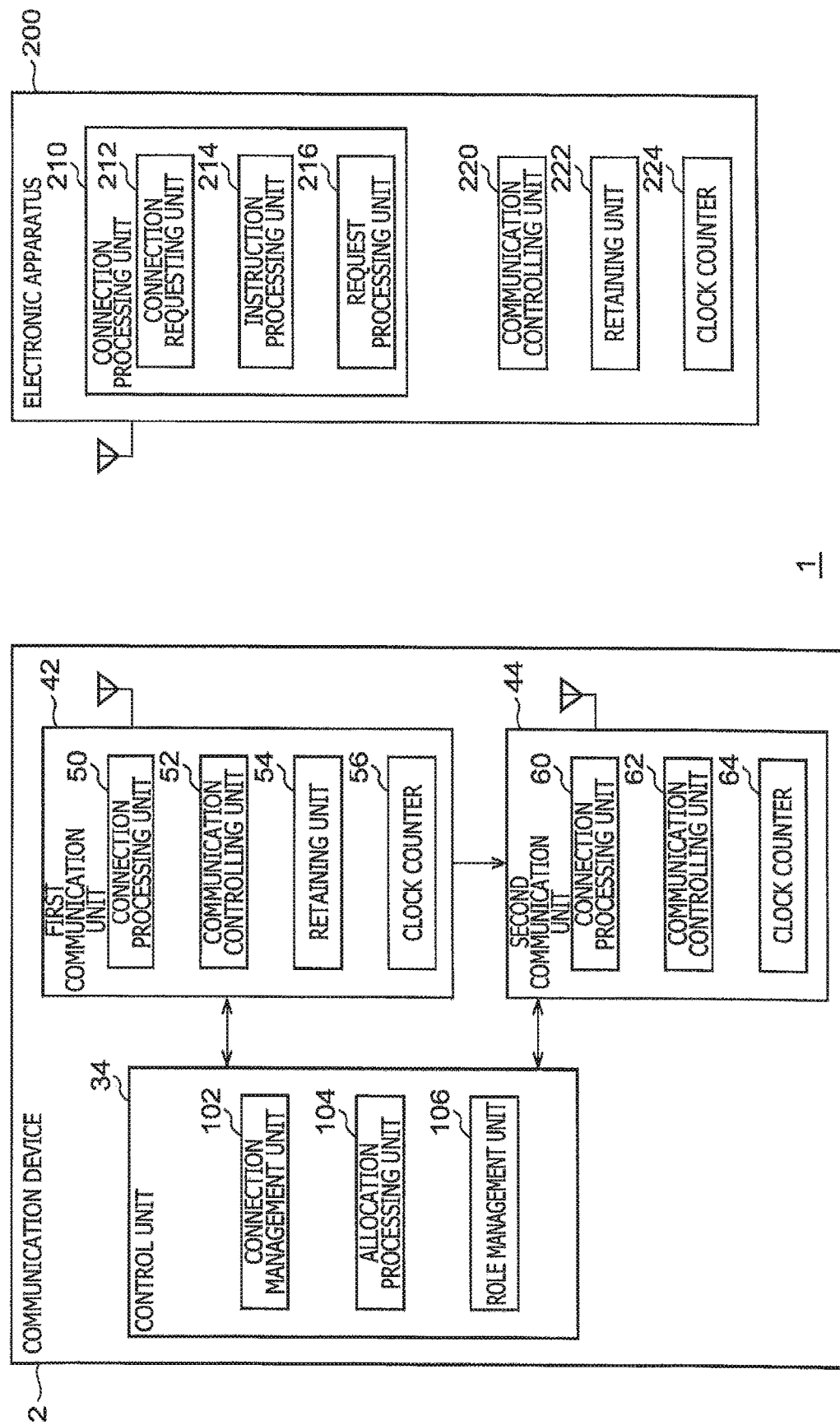
FIG. 3 is a view depicting a configuration relating to communication between the communication device and an electronic apparatus.

FIG. 3 depicts a configuration relating to communication between the communication device 2 and an electronic apparatus 200. The control unit 34 functions as a device driver for controlling the first communication unit 42 and the second communication unit 44. The control unit 34 includes a connection management unit 102, an allocation processing unit 104, and a role management unit 106. Any one or more of these may be considered as a "control unit" in the context of the discussions below.

The first communication unit 42 has a function for wirelessly communicating with an external apparatus by the Bluetooth protocol and includes a connection processing unit 50, a communication controlling unit 52, a retaining unit 54, and a clock counter 56. The connection processing unit 50 executes a process for establishing wireless connection to an electronic apparatus 200. The communication controlling unit 52 transmits and receives a data signal to and from the electronic apparatus 200 after establishment of the connection. The clock counter 56 generates a BT clock of 28 bits whose clock rate is 3.4 KHz. The retaining unit 54 retains apparatus ID information of electronic apparatus 200 with which a pairing process was performed in the past, and the connection processing unit 50 has a function for waiting for a connection request from an external electronic apparatus 200.

The second communication unit 44 has a function for wirelessly communicating with an external apparatus by the Bluetooth protocol and includes a connection processing unit 60, a communication controlling unit 62, and a clock counter 64. The connection processing unit 60 executes a process for establishing wireless connection to an electronic apparatus 200 from which a connection request is received by the first communication unit 42. The communication controlling unit 62 transmits and receives a data signal to and from the electronic apparatus 200 after establishment of the connection. The clock counter 64 generates a BT clock of 28 bits whose clock rate is 3.4 KHz. In the communication device 2 of the embodiment, the value of a predetermined bit of the BT clock of the clock counter 56 and the value of the predetermined bit of the BT clock of the clock counter 64 are controlled so as to synchronize with each other. Different from the connection processing unit 50, the connection processing unit 60 in the embodiment does not have a function for waiting for a connection request from an external electronic apparatus 200 and does not wait for a connection request. It is to be noted that, although, in a different example, the connection processing unit 60 may have a function for waiting for a connection request, it is desirable to restrict the waiting function such that the connection processing unit 60 does not wait for a connection request.

The electronic apparatus 200 wirelessly connects to the first communication unit 42 and/or the second communication unit 44 by the Bluetooth protocol. The electronic apparatus 200 includes a connection processing unit 210, a communication controlling unit 220, a retaining unit 222, and a clock counter 224, and the connection processing unit 210 includes a connection requesting unit 212, an instruction processing unit 214, and a request processing unit 216. The retaining unit 222 retains apparatus ID information of the first communication unit 42 acquired by a pairing process with the communication device 2.

Referring to FIG. 3, components described as functioning blocks that perform various processes can be configured, in hardware, from a circuit block, a memory, and other large scale integrations (LSIs) and is implemented, in software, from system software, a game program loaded in the memory and so forth. Accordingly, it is recognized by those skilled in the art that the functioning blocks can be implemented in various forms only from hardware, only from software, or from a combination of them and are not restrictive.

In the following, a procedure for establishing wireless connecting between an electronic apparatus 200 and the communication device 2 is described.

In order to wirelessly connect to the communication device 2, the electronic apparatus 200 carried out a pairing process with the communication device 2 in advance. In the pairing process, the electronic apparatus 200 and the first communication unit 42 exchanged mutual apparatus ID information. Therefore, in the retaining unit 222 of the electronic apparatus 200, the apparatus ID information of the first communication unit 42 has been retained, and in the retaining unit 54 of the first communication unit 42, the apparatus ID information of the electronic apparatus 200 has been retained. As the first communication unit 42 has performed the pairing process with a plurality of electronic apparatuses 200a to 200d to which the first communication unit 42 is wirelessly connectable, the apparatus ID information of the plurality of electronic apparatuses 200a to 200d has been retained into the retaining unit 54 to generate an apparatus ID list.

The communication device 2 is in a wake on BT state when it has no wireless connection to any electronic apparatus 200.

Figure 4:
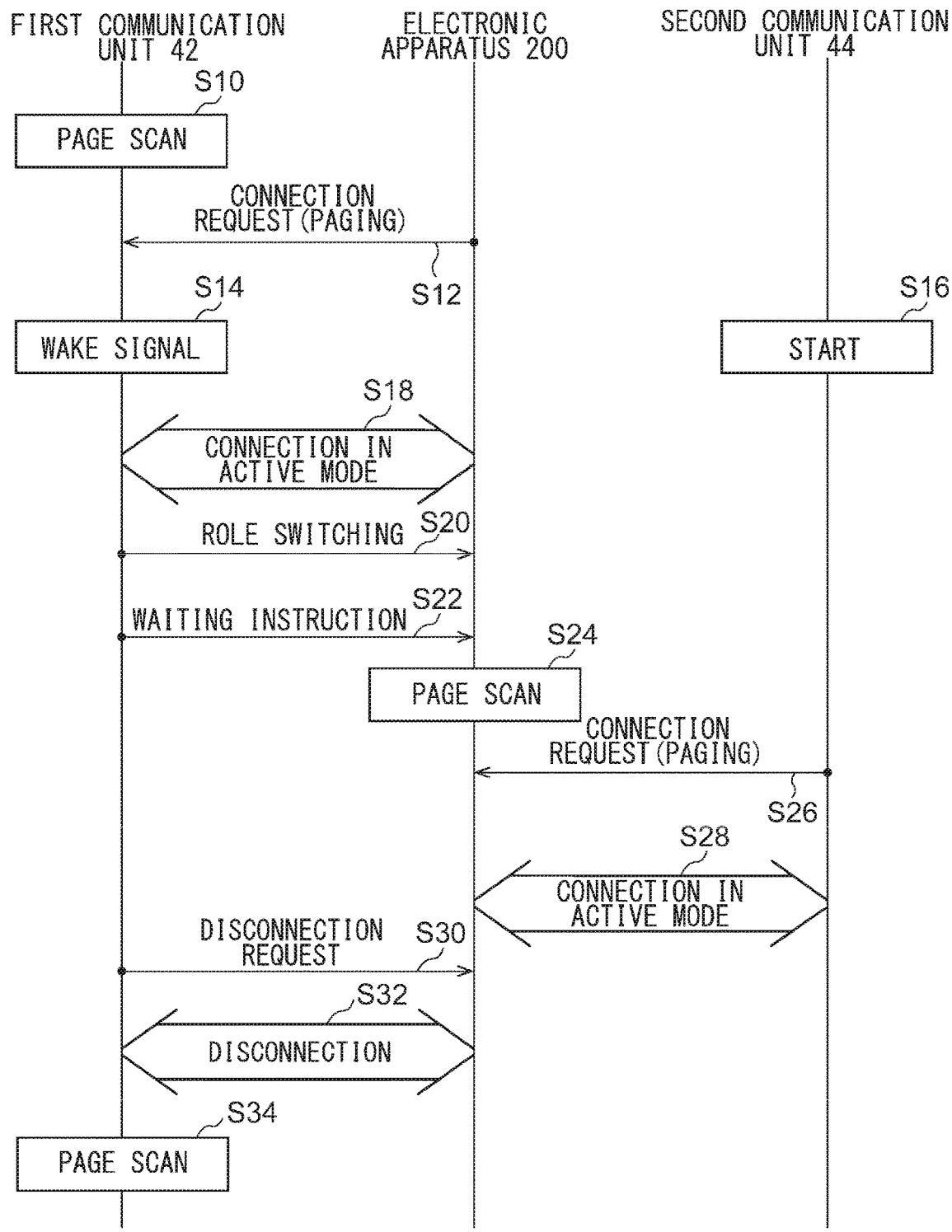
FIG. 4 is a view depicting a sequence by which the electronic apparatus and the communication device establish wireless connection therebetween.

FIG. 4 depicts a sequence by which the electronic apparatus 200 and the communication device 2 establish wireless connection to each other. In the wake on BT state, the first communication unit 42 operates in a page scan mode in which it waits for a connection request from an external electronic apparatus 200 (S10). In the page scan mode, the connection processing unit 50 of the first communication unit 42 waits for a connection request (paging) from an electronic apparatus 200 included in the connectable apparatus ID list.

In the electronic apparatus 200, the connection requesting unit 212 reads out the apparatus ID information of the first communication unit 42 from the retaining unit 222 and transmits a connection request including the apparatus ID information of the first communication unit 42 to the first communication unit 42 (S12). In the first communication unit 42, when the connection processing unit 50 receives the connection request from the electronic apparatus 200 having a device ID included in the apparatus ID list, it outputs a WAKE signal to the system controller 20 in accordance with the wake on parameters (S14). When the system controller 20 receives the WAKE signal, it starts up the host block 30 and the USB module 46 to make the USB connection between the USB module 32 and the USB module 46 active.

In the control unit 34, the connection management unit 102 downloads firmware into the second communication unit 44 through the USB connection to initialize the second communication unit 44. Consequently, the second communication unit 44 is placed into a wirelessly connectable state to an external electronic apparatus 200 (S16). The connection management unit 102 executes an authentication process and an encryption process with the electronic apparatus 200, and the first communication unit 42 establishes connection to the electronic apparatus 200 in an active mode that is a data transfer mode in which it is possible to transfer data (S18).

A BT communication apparatus operates as one of a master and a slave. (In some examples, a particular BT communication apparatus may be constrained by design or by configuration setting to operate at any point in time as either a master or a slave, which is to say that in such examples the BT communication apparatus cannot operate simultaneously as both a master and a slave even with different communication destinations). If two BT communication apparatuses establish a BT link therebetween on the base band level, then the paging device becomes the master and the paged device becomes the slave. The master determines a frequency hopping pattern on the basis of an own BT device address and determines a phase of a hopping sequence by an own clock.

At the point of time of S18, the electronic apparatus 200 that is the paging device is the master, and the first communication unit 42 that is the paged device is the slave. In order for the communication device 2 to control the electronic apparatus 200 that is a peripheral, it is necessary for the first communication unit 42 and the electronic apparatus 200 to operate as the master and the slave, respectively, the role management unit 106 transmits a role switching instruction for switching the roles (roles) of the master and the slave to the electronic apparatus 200 through the first communication unit 42 (S20). In the electronic apparatus 200, the instruction processing unit 214 accepts the role switching instruction. The connection processing unit 50 in the first communication unit 42 and the instruction processing unit 214 execute switching of the roles in synchronism with each other after a predetermined interval of time after the role switching instruction is transmitted. Consequently, the electronic apparatus 200 starts operation as the slave and the first communication unit 42 starts operation as the master.

In the communication system 1 of the embodiment, after the first communication unit 42 accepts a connection request from an electronic apparatus 200 and establishes wireless connection to the electronic apparatus 200, it instructs the electronic apparatus 200 to establish a state in which the electronic apparatus 200 waits for acceptance of a connection request (S22). This is a process necessary to switch the connection destination of the electronic apparatus 200 (from which the connection request was received) from the first communication unit 42 to the second communication unit 44, and such switching can occur in response to receipt of the connection request as well as in dependence upon an allocation process. In the following, a reason why the first communication unit 42 transmits a waiting instruction to the electronic apparatus 200 is described.

The connection management unit 102 acquires a communication situation (or communication status) of the first communication unit 42 with an external apparatus and a communication situation (or communication status) of the second communication unit 44 with an external apparatus. At the point of time of establishment of connection at S18, the first communication unit 42 is connected to one electronic apparatus 200 and the second communication unit 44 is not connected to any electronic apparatus 200. The connection management unit 102 may acquire the numbers of external apparatus to which the first communication unit 42 and the second communication unit 44 are connected individually as the communication situations.

The allocation processing unit 104 executes an allocation process for determining the connection destination of the external apparatus to the first communication unit 42 or the second communication unit 44 on the basis of the communication situations acquired by the connection management unit 102 of the first communication unit 42 and the second communication unit 44. Here, while the first communication unit 42 has the function for waiting for a connection request from an external apparatus, the second communication unit 44 does not have the function or does not execute the function for waiting for a connection request from an external apparatus. Since the first communication unit 42 in the embodiment has a role of periodically operating in the page scan mode, the allocation processing unit 104 preferably determines the connection destination of the external apparatus to the first communication unit 42 or the second communication unit 44 such that the communication load with the external apparatus on the first communication unit 42 is equal to or lower than the communication load with the external apparatus on the second communication unit 44. Therefore, when only one electronic apparatus 200 is connected to the communication device 2, preferably the allocation processing unit 104 determines the connection destination of the electronic apparatus 200 to the second communication unit 44 to make the communication load on the first communication unit 42 lighter than the communication load on the second communication unit 44.

The communication load to be used as a reference for decision of an allocation destination by the allocation processing unit 104 is a load factor having an influence on communication by each communication unit and may be the number of external apparatus to which each communication unit is connected. Therefore, the allocation processing unit 104 may allocate an external apparatus to the first communication unit 42 or the second communication unit 44 such that the number of external apparatus to which the first communication unit 42 is connected is smaller than the number of external apparatus to which the second communication unit 44 is connected.

It is to be noted that the communication load to be used as a reference may be a communication data amount of each communication unit with an external apparatus. Although the data amount of voice data in voice chat with an electronic apparatus 200 is great, the data amount of operation data of a game controller is small. Therefore, the connection management unit 102 may monitor the communication data amount between each communication unit and an electronic apparatus 200, and the allocation processing unit 104 may determine the connection destination of the electronic apparatus 200 such that the communication load on the first communication unit 42 becomes lower than the communication load upon the second communication unit 44. The communication load to be used as a reference may be a communication error rate in each communication unit or may be a combination of some of them.

At the point of time of establishment of connection at S18, only one electronic apparatus 200 is already connected to the communication device 2. Therefore, the allocation processing unit 104 determines to change the connection destination of the electronic apparatus 200 from the first communication unit 42 to the second communication unit 44. In the communication system 1 of the embodiment, in order to change the connection destination, the allocation processing unit 104 initiates a connection process of the already connected electronic apparatus to the second communication device. To do this, the electronic apparatus 200 is caused to operate in a scan mode (such as the page scan mode) and the second communication unit 44 is caused to transmit a connection request to the electronic apparatus 200. To this end, at S22, the first communication unit 42 transmits a signal (waiting instruction signal) for instructing the electronic apparatus 200 to establish a state in which the electronic apparatus 200 waits for a connection request from the second communication unit 44.

In this connection destination switching process, the allocation processing unit 104 notifies the first communication unit 42 and the second communication unit 44 that the connection destination of the electronic apparatus 200 currently connected to the first communication unit 42 is to be switched from the first communication unit 42 to the second communication unit 44. At this time, the allocation processing unit 104 notifies the first communication unit 42 and the second communication unit 44 also of apparatus ID information (BT device address) of the electronic apparatus 200 to which the connection destination is to be changed. Consequently, the first communication unit 42 and the second communication unit 44 recognize that they are to operate such that the electronic apparatus 200 currently connected to the first communication unit 42 is connected to the second communication unit 44.

In the first communication unit 42, the connection processing unit 50 transmits a waiting instruction signal to the electronic apparatus 200 (S22). The waiting instruction signal may include identification information of an apparatus (for example, communication unit) from which a connection request is to be transmitted, in the present example, apparatus ID information of the second communication unit 44. In the electronic apparatus 200, the instruction processing unit 214 receives a waiting instruction signal and accepts an instruction to enter a state in which it waits for a connection request from the second communication unit 44. Consequently, while the instruction processing unit 214 maintains the connection to the first communication unit 42, the request processing unit 216 operates in the page scan mode for waiting for a connection request from the second communication unit 44 (S24).

At this time, the instruction processing unit 214 operates so as to alternately switch a communication period (first period) with the first communication unit 42 of the connection switching source and a scan period (second period) within which the second communication unit 44 of the connection switching source waits for a connection request. The connection processing unit 50 may place timing information that defines alternate switching between the first period and the second period into the waiting instruction signal such that the instruction processing unit 214 alternately and periodically switches the communication period with the first communication unit 42 and the scan period for waiting for a connection request from the second communication unit 44 in accordance with the timing information included in the waiting instruction signal.

It is to be noted that the connection processing unit 50 preferably sets timing information in response to the connection situation of the electronic apparatus 200 and the communication device 2. At the point of time of S22 in FIG. 4, the electronic apparatus 200 is in a stage in which it performs a new connection process with the communication device 2 and does not yet start data communication of voice data or the like with the first communication unit 42. Therefore, the connection processing unit 50 sets timing information TB such that the electronic apparatus 200 can quickly establish wireless communication with the second communication unit 44. For example, the connection processing unit 50 may set the timing information TI1 indicating that the second period is longer than the first period.

In the page scan mode carried out within a scan period (second period), the request processing unit 216 waits for a connection request from the second communication unit 44 that has the apparatus ID information included in the waiting instruction signal. In the second communication unit 44, the connection processing unit 60 transmits a connection request including the apparatus ID information of the electronic apparatus 200 to the electronic apparatus 200 (S26). If the request processing unit 216 accepts the connection request, then a connection process is carried out between the request processing unit 216 and the connection processing unit 60. Consequently, the second communication unit 44 is connected to the electronic apparatus 200 in the active mode (S28).

If the connection management unit 102 detects that connection is established between the second communication unit 44 and the electronic apparatus 200, then it instructs the first communication unit 42 to cancel the connection to the electronic apparatus 200. Receiving this instruction, the connection processing unit 50 transmits a disconnection request to the electronic apparatus 200 (S30). It is to be noted that the disconnection request may be transmitted from the electronic apparatus 200 to the first communication unit 42. Thereafter, the connection between the first communication unit 42 and the electronic apparatus 200 is cancelled (S32) (for example by the communication device), and the electronic apparatus 200 is connected only to the second communication unit 44. In this manner, in the communication system 1, after the second communication unit 44 establishes connection to the electronic apparatus 200, the wireless connection between the first communication unit 42 and the electronic apparatus 200 is cancelled (for example by the communication device), and the electronic apparatus 200 is wirelessly connected only to the second communication unit 44. The first communication unit 42 then operates in a page scan mode for waiting for a connection request from an external electronic apparatus 200 (S34) and waits for a connection request (paging) from an electronic apparatus 200 included in the connectable apparatus ID list.

The procedure when a first electronic apparatus 200 establishes connection to the communication device 2 is described above. In the following, a procedure when second and succeeding electronic apparatuses 200 establish connection to the communication device 2 is described with reference to connection transition diagrams depicting connection states is described.

Figure 5:
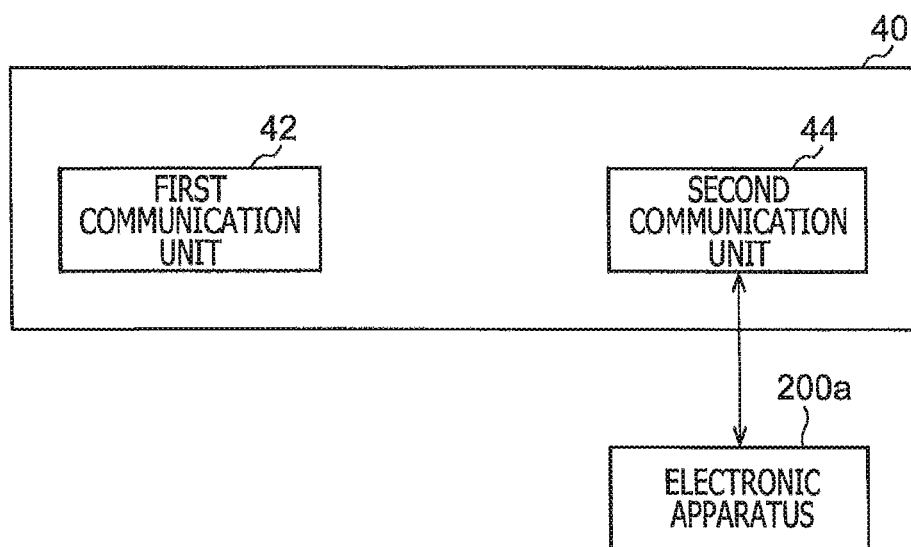
FIG. 5 is a view depicting a state in which a first electronic apparatus is wirelessly connected to a second communication unit.

FIG. 5 depicts a state in which the first electronic apparatus 200a is wirelessly connected to the second communication unit 44 in accordance with the wireless connection sequence depicted in FIG. 4. As described above, the electronic apparatus 200a transmits a connection request to the first communication unit 42 to establish connection to the first communication unit 42 and then operates in the page scan mode in which it waits for a connection request from the second communication unit 44. The electronic apparatus 200 receives a connection request from the second communication unit 44 and establishes connection to the second communication unit 44 and then cancels the connection to the first communication unit 42. FIG. 5 depicts this state.

Figure 6:
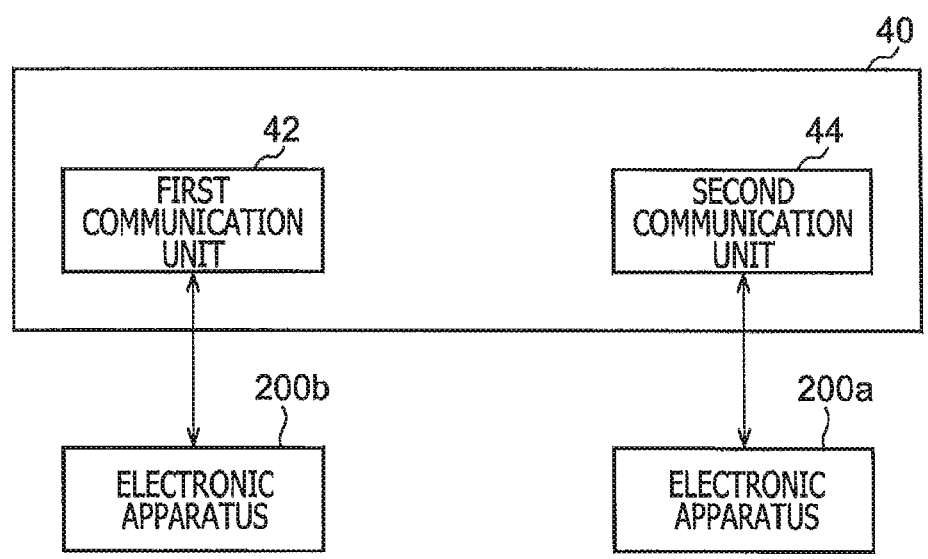
FIG. 6 is a view depicting a state in which a second electronic apparatus is wirelessly connected to a first communication unit.

FIG. 6 depicts a state in which the second electronic apparatus 200b is wirelessly connected to the first communication unit 42. The electronic apparatus 200b transmits a connection request to the first communication unit 42 to establish connection to the first communication unit 42 in the active mode.

The connection management unit 102 acquires a communication situation of the first communication unit 42 with an external apparatus and a communication situation of the second communication unit 44 with an external apparatus. In the connection state depicted in FIG. 6, the first communication unit 42 is connected to one electronic apparatus 200b and the second communication unit 44 is connected to one electronic apparatus 200a. The connection management unit 102 acquires the number of electronic apparatus 200 to which each of the first communication unit 42 and the second communication unit 44 is connected as a communication situation. The allocation processing unit 104 executes a process for allocating the electronic apparatus 200b to one of the first communication unit 42 and the second communication unit 44 on the basis of the numbers of electronic apparatus 200 to which the first communication unit 42 and the second communication unit 44 are individually connected.

The allocation processing unit 104 allocates the electronic apparatus 200b to which connection is established newly to the first communication unit 42 or the second communication unit 44 such that the communication load on the first communication unit 42 with the external apparatus becomes equal to or lower than the communication load on the second communication unit 44 with the external apparatus. In the state in which the second electronic apparatus 200b establishes connection to the first communication unit 42 (state depicted in FIG. 6), the first communication unit 42 is connected to one electronic apparatus 200b and the second communication unit 44 is connected to one electronic apparatus 200a, and the communication loads on the first communication unit 42 and the second communication unit 44 are equal to each other. Therefore, the allocation processing unit 104 determines that there is no problem in that the connection destination of the electronic apparatus 200b is the first communication unit 42 and accordingly determines that the connection destination of the electronic apparatus 200b is not to be changed.

Figure 7:
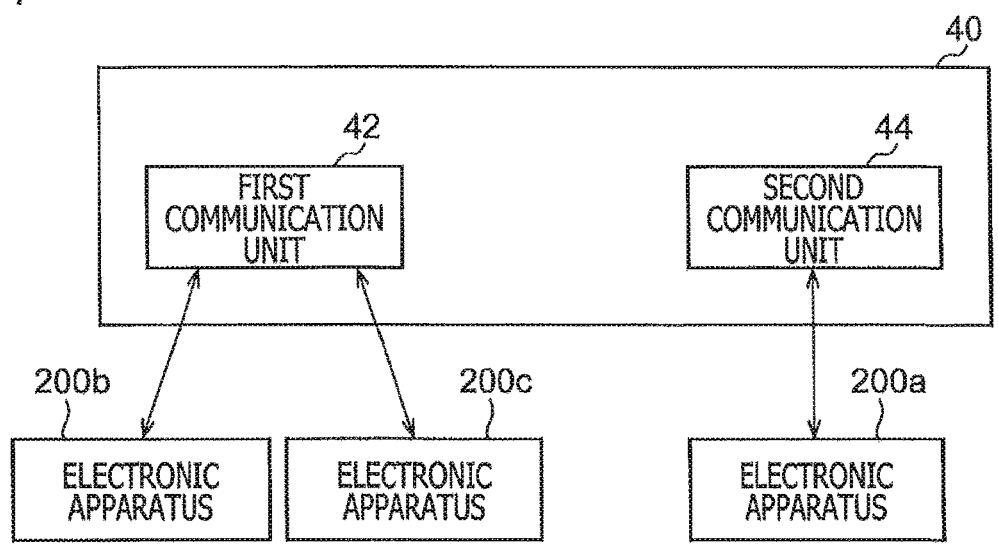
FIG. 7 is a view depicting a state in which a third electronic apparatus is wirelessly connected to the first communication unit.

FIG. 7 depicts a state in which the third electronic apparatus 200c is wirelessly connected to the first communication unit 42. The electronic apparatus 200c transmits a connection request to the first communication unit 42 to establish connection to the first communication unit 42 in the active mode.

The connection management unit 102 acquires the connection number of external apparatus to the first communication unit 42 and the connection number of external apparatus to the second communication unit 44. In the connection state depicted in FIG. 7, the first communication unit 42 is connected to two electronic apparatuses 200b and 200c and the second communication unit 44 is connected to one electronic apparatus 200a. The allocation processing unit 104 allocates the electronic apparatus 200c to which connection is established newly to the first communication unit 42 or the second communication unit 44 such that the connection number of external apparatus to the first communication unit 42 becomes equal to or smaller than the connection number of external apparatus to the second communication unit 44. In the state in which the third electronic apparatus 200c establishes connection to the first communication unit 42 (state depicted in FIG. 7), the connection number of external apparatus to the first communication unit 42 is greater than the connection number of external apparatus to the second communication unit 44. Therefore, the allocation processing unit 104 determines that the connection destination of the electronic apparatus 200c is the second communication unit 44 and accordingly determines to change the connection destination of the electronic apparatus 200c from the first communication unit 42 to the second communication unit 44.

Figure 8:
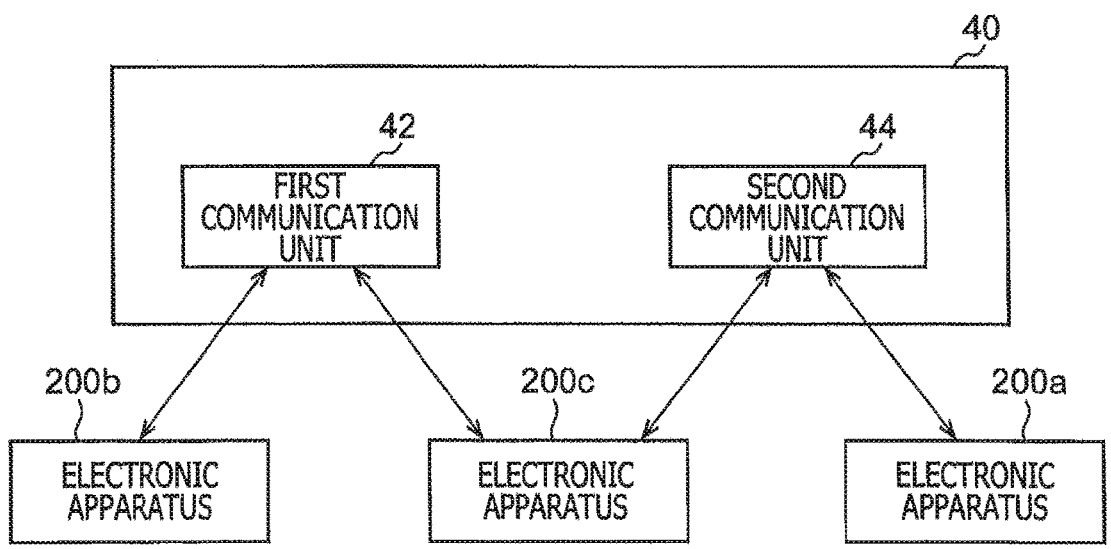
FIG. 8 is a view depicting a state in which the third electronic apparatus is wirelessly connected to the first communication unit and the second communication unit simultaneously.

FIG. 8 depicts a state in which the electronic apparatus 200c is connected to the first communication unit 42 and the second communication unit 44 simultaneously. The first communication unit 42 transmits a signal (waiting instruction signal) for instructing the electronic apparatus 200c to enter a state in which it waits for a connection request to the electronic apparatus 200c, and while the electronic apparatus 200c maintains the connection to the first communication unit 42, it operates in the page scan mode in which it waits for a connection request from the second communication unit 44. The electronic apparatus 200c receives a connection request from the second communication unit 44 and establishes connection to the second communication unit 44. FIG. 8 depicts this state.

Figure 9:
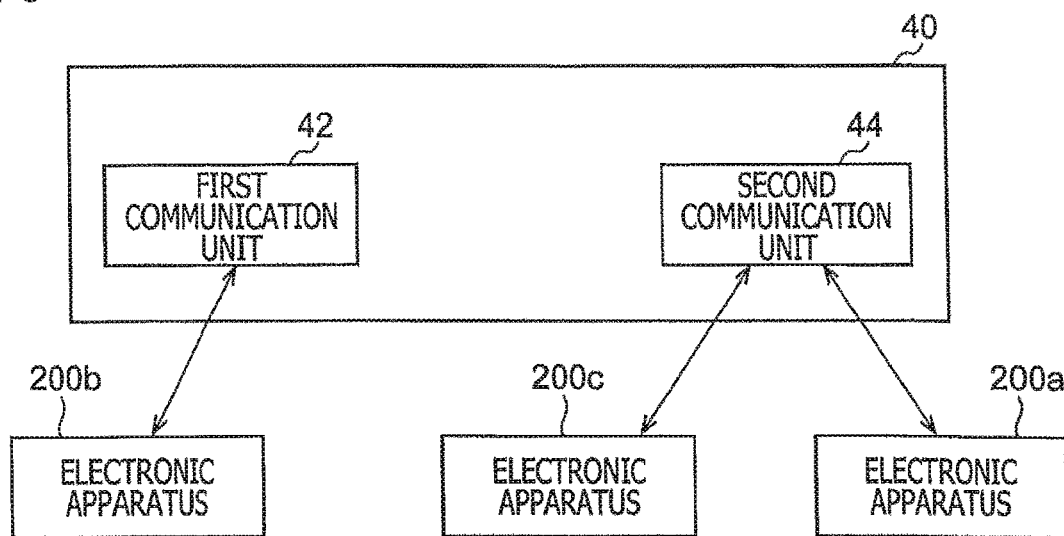
FIG. 9 is a view depicting a state in which the third electronic apparatus is disconnected from the first communication unit.

FIG. 9 depicts a state in which the electronic apparatus 200c cancels the connection to the first communication unit 42. The first communication unit 42 transmits a disconnection request to the electronic apparatus 200c to cancel the connection to the electronic apparatus 200c. FIG. 9 depicts this state.

Figure 10:
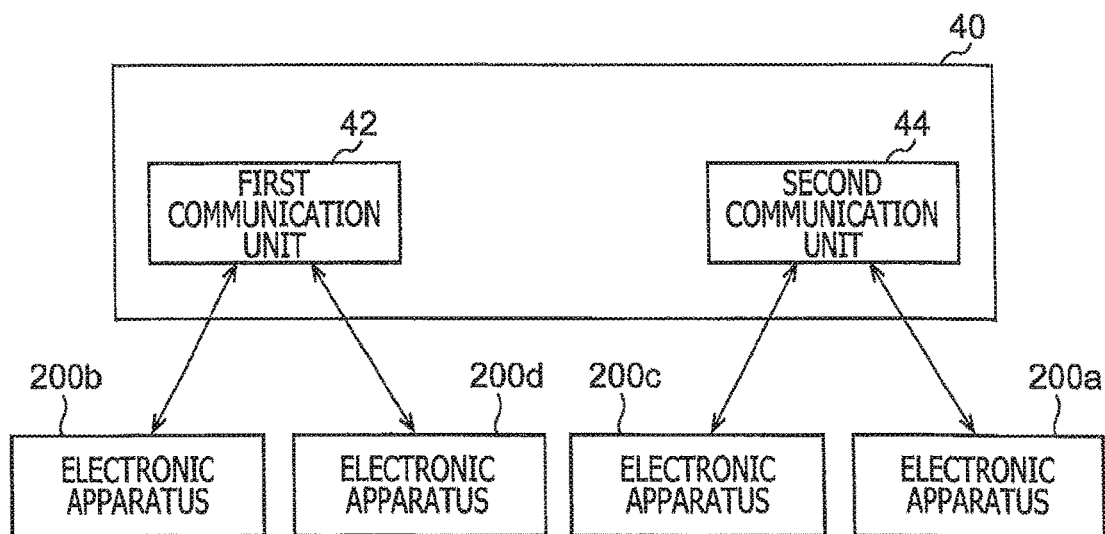
FIG. 10 is a view depicting a state in which a fourth electronic apparatus is wirelessly connected to the first communication unit.

FIG. 10 depicts a state in which the fourth electronic apparatus 200d is wirelessly connected to the first communication unit 42. The electronic apparatus 200d transmits a connection request to the first communication unit 42 to establish connection to the first communication unit 42 in the active mode.

The connection management unit 102 acquires the connection number of external apparatus to the first communication unit 42 and the connection number of external apparatus to the second communication unit 44. In the connection state depicted in FIG. 10, the first communication unit 42 is connected to the two electronic apparatuses 200*b* and 200*d*, and the second communication unit 44 is connected to the two electronic apparatuses 200*a* and 200*c*. The allocation processing unit 104 allocates the electronic apparatus 200*d* to which connection is established newly to the first communication unit 42 or the second communication unit 44 such that the connection number of external apparatus to the first communication unit 42 becomes equal to or smaller than the connection number of external apparatus to the second communication unit 44. In the state in which the fourth electronic apparatus 200*d* establishes connect to the first communication unit 42 (state depicted in FIG. 10), the connection number of external apparatus to the first communication unit 42 is equal to the connection number of external apparatus to the second communication unit 44. Therefore, the allocation processing unit 104 decides that the connection destination of the electronic apparatus 200*d* may be the first communication unit 42 and accordingly determines that the connection destination of the electronic apparatus 200*d* is not to be changed.

Figure 11:
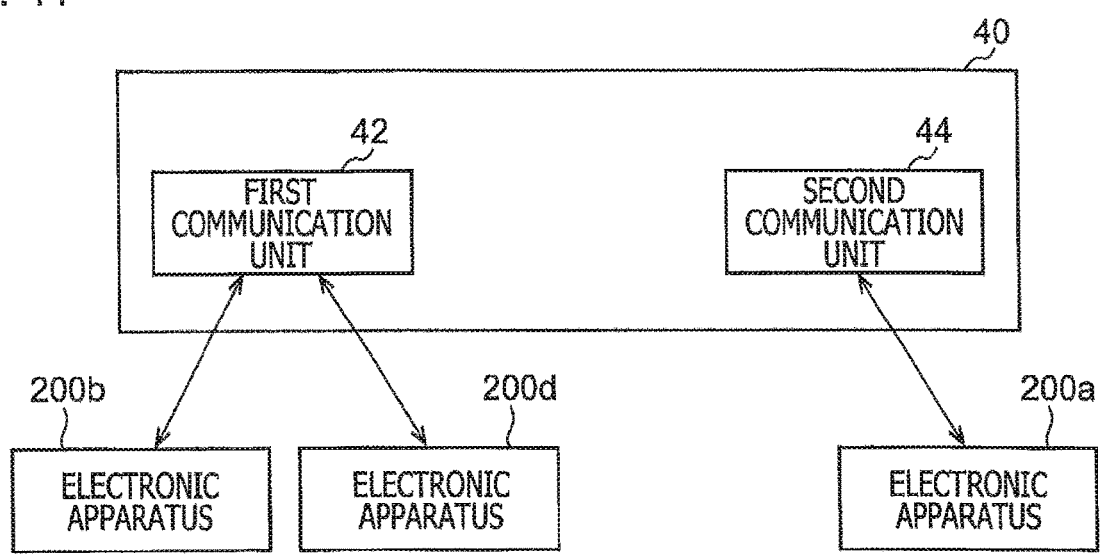
FIG. 11 is a view depicting a state in which the third electronic apparatus is disconnected from the second communication unit.

FIG. 11 depicts a state in which the third electronic apparatus 200*c* is disconnected from the second communication unit 44. For example, if the user of the electronic apparatus 200*c* ends the game play of the electronic apparatus 200*c* and logs out from the device main body 3, then the connection between the electronic apparatus 200*c* and the second communication unit 44 is cancelled.

After the connection between the electronic apparatus 200*c* and the communication device 2 is cancelled, the connection management unit 102 acquires the connection number of external apparatus to the first communication unit 42 and the connection number of external apparatus to the second communication unit 44. In the connection state depicted in FIG. 11, the first communication unit 42 is connected to the two electronic apparatuses 200*b* and 200*d* and the second communication unit 44 is connected to the one electronic apparatus 200*a*. The allocation processing unit 104 executes an allocation process taking it as a trigger (or in other words, in response to a detection) that the wireless connection to the electronic apparatus 200*c* to which the communication device 2 has been connected ends. In particular, the allocation processing unit 104 changes the connection destination of the electronic apparatus 200*d*, which has been connected already, such that the connection number of external apparatus to the first communication unit 42 becomes equal to or smaller than the connection number of external apparatus to the second communication unit 44. In the state depicted in FIG. 11, since the connection number of external apparatus to the first communication unit 42 is greater than the connection number of external apparatus to the second communication unit 44, the allocation processing unit 104 determines to change the connection destination of the electronic apparatus 200*d* from the first communication unit 42 to the second communication unit 44.

Figure 12:
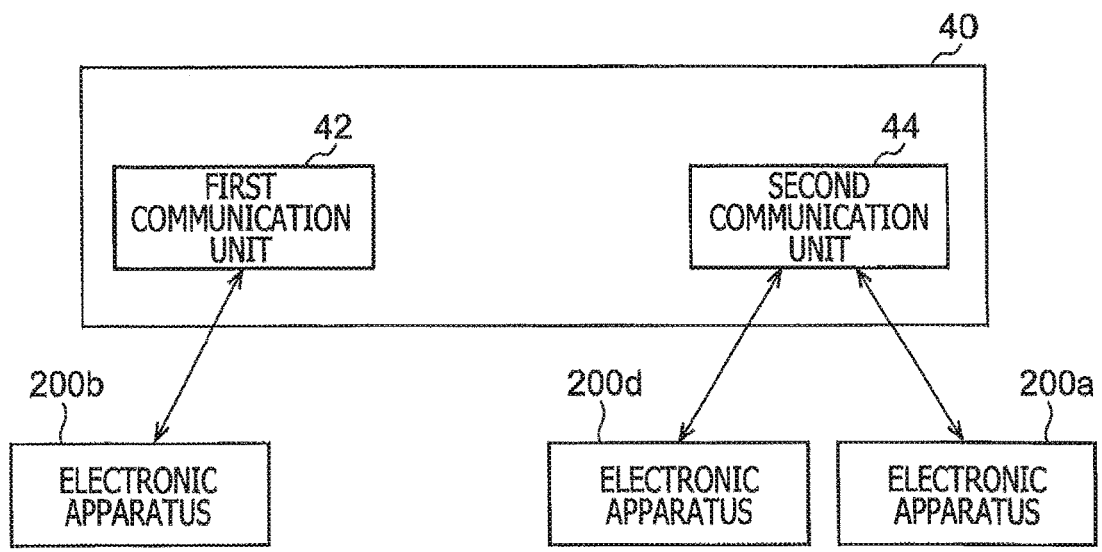
FIG. 12 is a view depicting a state in which the fourth electronic apparatus is connected to the second communication unit.

FIG. 12 depicts a state in which the electronic apparatus 200*d* is connected to the second communication unit 44. When the connection destination is to be switched, the electronic apparatus 200*d* receives a waiting instruction signal from the first communication unit 42 and enters a state in which it waits for a connection request from the second communication unit 44. The instruction processing unit 214 in the electronic apparatus 200*d* alternately and periodically performs switching between a communication period with the first communication unit 42 and a scan period for waiting for a connection request from the second communication unit 44 in accordance with timing signal included in the waiting instruction signal. If the request processing unit 216 in the electronic apparatus 200*d* accepts a connection request from the second communication unit 44, then a connection process is carried out between the electronic apparatus 200*d* and the second communication unit 44. In this manner, going through the state in which the electronic apparatus 200*d* is connected to the first communication unit 42 and the second communication unit 44 simultaneously, the electronic apparatus 200*d* is disconnected from the first communication unit 42 and is connected only to the second communication unit 44.

At the point of time at which a waiting instruction signal is received, the electronic apparatus 200*d* is in a state in which data communication of voice data or the like with the first communication unit 42 is being carried out already, and the circumstances are different from those in the case where a new connection process is performed as indicated at S22 of FIG. 4. Therefore, the connection processing unit 50 sets timing information TI2 such that, while priority is given to maintaining data communication between the electronic apparatus 200*d* and the first communication unit 42, the connection processing unit 50 can establish wireless communication to the second communication unit 44 during the period. The connection processing unit 50 may set the timing information TI2 such that the communication period (first period) with the first communication unit 42 that is the connection switching source is made longer than the scan period (second period) within which the connection processing unit 50 waits for a connection request from the second communication unit 44 that is the connection switching destination. In other words, timing information TB transmitted upon new connection processing may be different from the timing information TI2 transmitted after data communication is started.

It is to be noted that, while, in the example of FIG. 12, the connection destination of the electronic apparatus 200*d* has been switched from the first communication unit 42 to the second communication unit 44, also when the connection destination is to be switched from the second communication unit 44 to the first communication unit 42, the connection processing unit 50 may place the timing information TI2 into a waiting instruction signal and the second communication unit 44 may transmit the waiting instruction signal to the electronic apparatus 200*d*.

In the communication system 1 of the embodiment, the allocation processing unit 104 determines the connection destination of an external apparatus to the first communication unit 42 or the second communication unit 44 such that the communication load with an external apparatus on the first communication unit 42 becomes equal to or lower than the communication load with an external apparatus on the second communication unit 44.

Therefore, even if data communication is started between the communication device 2 and the electronic apparatus 200, the switching process of the connection destination of the electronic apparatus 200 is carried out in response to a change of the connection environment between the communication device 2 and the electronic apparatus 200. In particular, if, after a waiting instruction signal including the timing information TI2 is transmitted to the electronic apparatus 200 in a state in which one of the first communication unit 42 and the second communication unit 44 is wirelessly connected to the electronic apparatus 200, the electronic apparatus 200 establishes the other one of the first communication unit 42 and the second communication unit 44, then the wireless connection between the one of the first communication unit 42 and the second communication unit 44 and the electronic apparatus 200 is cancelled. As the allocation processing unit 104 determines a connection destination of an external apparatus in accordance with a reference using a communication load, stable page scan mode operation by the first communication unit 42 is guaranteed to the new external apparatus.

In the communication system 1 of the embodiment, since the electronic apparatus 200 performs a paging process for the first communication unit 42, when connection between the first communication unit 42 and the electronic apparatus 200 is first established, the electronic apparatus 200 becomes (or operates as) a master and the first communication unit 42 becomes (or operates as) a slave. Thereafter, in order to transmit and receive data of voice chat, a game play and so forth, it is necessary for the communication device 2 and the electronic apparatus 200 to become a master and a slave, respectively, such that communication of the electronic apparatus 200 is controlled by the communication device 2. Therefore, the role management unit 106 transmits a role switching instruction for switching the roles (roles) of the master and the slave to the electronic apparatus 200 through the first communication unit 42 to switch the electronic apparatus 200 to the slave and switch the first communication unit 42 to the master as indicated at S20 of FIG. 4.

Although, in FIG. 4, only one electronic apparatus 200 has established wireless connection to the first communication unit 42 at the point of time of S18 because FIG. 4 depicts a sequence from a state of the waken on BT, after the communication device 2 is started, the electronic apparatus 200c may try to newly establish connection to the first communication unit 42 in a state in which the electronic apparatus 200b is already connected to the first communication unit 42 in the active mode, for example, as depicted in FIG. 7.

Figure 13:
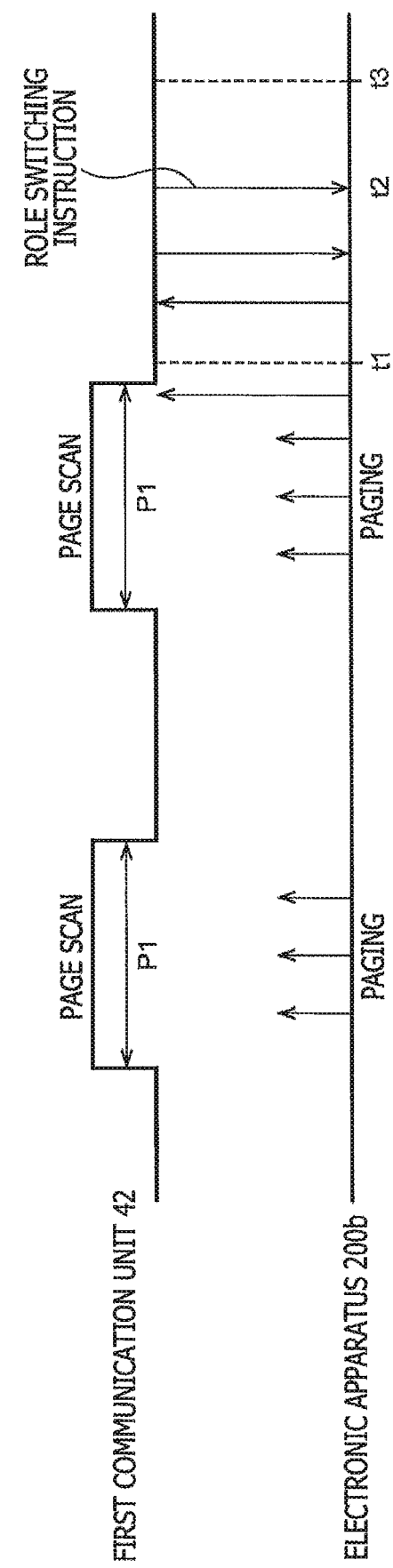
FIG. 13 is a view depicting a timing chart when an electronic apparatus performs paging.

FIG. 13 depicts a timing chart when the electronic apparatus 200b pages the first communication unit 42. At this time, the first communication unit 42 is not connected to an external apparatus. In the case where the first communication unit 42 is not connected to an external apparatus, it waits for a connection request in the first mode in which a waiting time period P1 is comparatively (that is, relatively) long.

The electronic apparatus 200b transmits a connection request (paging) to the first communication unit 42. The first communication unit 42 establishes connection to the electronic apparatus 200b at time t1. At time t1, the first communication unit 42 and the electronic apparatus 200b are in the state at S18 in the sequence of FIG. 4, and at the point of time of establishment of connection, the first communication unit 42 becomes the slave and the electronic apparatus 200b becomes the master. Thus, the role management unit 106 recognizes the roles (roles) of them.

After the electronic apparatus 200b is connected, the role management unit 106 controls the period within which the first communication unit 42 is to operate as the slave in response to a communication situation with other external apparatus other than the electronic apparatus 200b to the first communication unit 42. At the point of time of time t1 depicted in FIG. 13, the first communication unit 42 is not connected to any other external apparatus. In this case, the role management unit 106 causes the first communication unit 42 to operate as the slave during a period within which the role switching process is carried out at time t3 after time t1.

After time t1, the first communication unit 42 and the electronic apparatus 200b transmit information necessary for data communication such as clock information and communication parameters, and after such procedure ends and such information has been transmitted or transferred, at time t2, the role management unit 106 transmits a role switching instruction for switching the roles (roles) of the master and the slave to the electronic apparatus 200b through the first communication unit 42. The connection processing unit 50 in the first communication unit 42 and the instruction processing unit 214 in the electronic apparatus 200b execute switching of the roles in synchronism with each other at time t3 after a predetermined period of time after transmission of the role switching instruction. Consequently, the electronic apparatus 200 operates as the slave and the first communication unit 42 operates as the master. In this manner, if any other external apparatus than the electronic apparatus 200b is not connected, then the role management unit 106 may cause the first communication unit 42 to operate as the salve during a period until a role switching process is carried out in accordance with a role switching instruction.

Therefore, in general terms, when the communication unit is connected to a given external apparatus, the control unit is configured to control a period during which the communication unit operates as the slave in response to a communication situation of the communication unit with a different external apparatus from the given external apparatus.

Figure 14:
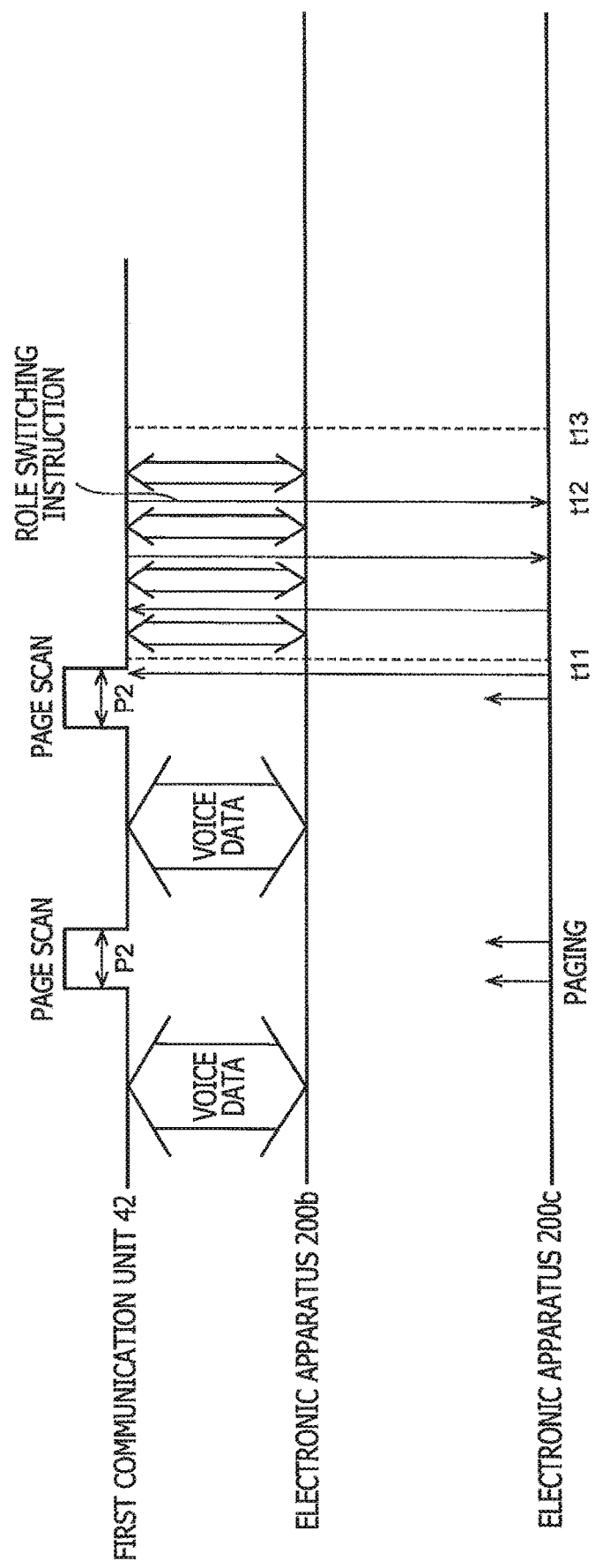
FIG. 14 is a view depicting a timing chart when an electronic apparatus performs paging.

FIG. 14 depicts a timing chart when the electronic apparatus 200c performs paging to the first communication unit 42. At this time, the first communication unit 42 already is in a state in which it is communicating with the electronic apparatus 200b in the active mode. In the case where the first communication unit 42 is in connection to an external apparatus, it waits for a connection request in a second mode in which a waiting time period P2 is relatively short. Consequently, the first communication unit 42 can wait for a connection request from the new electronic apparatus 200c while maintaining the communication of voice data or the like with the electronic apparatus 200b.

To this end, the waiting time period P2 is preferably set to a period of time within which communication between the first communication unit 42 and the electronic apparatus 200b is not disturbed. For example, in the case where the communication cycle of voice data between the first communication unit 42 and the electronic apparatus 200b is 10 ms, the waiting time period P2 is preferably set to a period of time shorter than 10 ms. This makes it possible for the first communication unit 42 to wait for a connection request from the new electronic apparatus 200c between time zones within which voice data is transmitted and received.

The electronic apparatus 200c transmits a connection request (paging) to the first communication unit 42. The first communication unit 42 establishes connection to the electronic apparatus 200c at time tn. At this time, the first communication unit 42 becomes the slave and the electronic apparatus 200c becomes the master, and the role management unit 106 recognizes the roles (roles) of them. After the electronic apparatus 200c is connected, the role management unit 106 controls the period during which the first communication unit 42 operates as the slave in response to a communication situation of the first communication unit 42 with other external apparatus than the electronic apparatus 200c. In the state depicted in FIG. 14, the first communication unit 42 is connected already to the electronic apparatus 200b, and the role management unit 106 controls the period during which the first communication unit 42 operates as the slave in the following manner.

Different from the situation depicted in FIG. 13, at time t11, the first communication unit 42 periodically performs data communication with the electronic apparatus 200b, and if the first communication unit 42 continues to be the slave within a period up to time t13 at which role switching is performed on the basis of the role switching instruction, then the first communication unit 42 cannot communicate with the electronic apparatus 200b. This signifies that, in the case where the user of the electronic apparatus 200b is voice chatting, the voice chart is temporarily interrupted during a period from time t11 to time t13.

Therefore, when the first communication unit 42 establishes connection to the electronic apparatus 200c, if it is already connected to the other electronic apparatus 200b, then the role management unit 106 alternately performs switching between a period during which the first communication unit 42 operates as the salve and another period during which the first communication unit 42 operates as the master. The period during which the first communication unit 42 operates as the master is a period within which data communication is possible between the first communication unit 42 and the electronic apparatus 200b, and the period during which the first communication unit 42 operates as the slave is a period within which transmission and reception of information necessary for data communication between the first communication unit 42 and the electronic apparatus 200c are possible.

Figure 15:
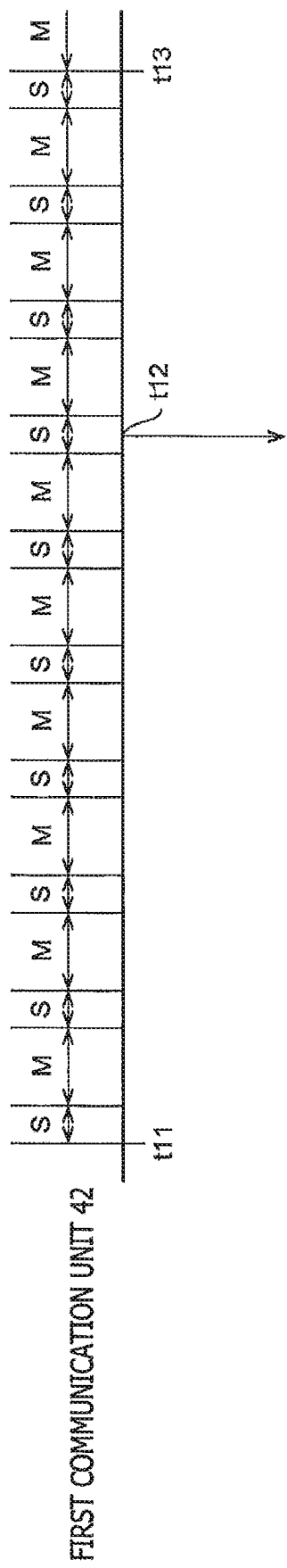
FIG. 15 is a view depicting a state of the first communication unit.

FIG. 15 depicts a state of the first communication unit 42 from time t11 to time t13. Here, "S" represents a period during which the first communication unit 42 is the slave, and "M" represents a period during which the first communication unit 42 is the master. The role management unit 106 periodically and alternately sets a slave period and a master period such that the first communication unit 42 can transmit and receive information necessary for communication with the electronic apparatus 200c within the slave period and can communicate data with the electronic apparatus 200b within the master period.

The period within which the first communication unit 42 operates as the slave is set on the basis of the communication cycle with the electronic apparatus 200b connected already. For example, in the case where the communication cycle of voice data between the first communication unit 42 and the electronic apparatus 200b is 10 ms, the period during which the first communication unit 42 operates as the slave is preferably set to a period shorter than 10 ms. This makes it possible to transmit and receive information to and from the new electronic apparatus 200c between time zones within which voice data is transmitted and received.

In the BT protocol, a BT communication apparatus that becomes the master performs transmission in an even-numbered slot, and another BT communication device that becomes the slave performs transmission in an odd-numbered slot. The slot cycle is 625 μs, and transmission operation by the master and transmission operation by the slave are defined by the BT clock of the master.

Figure 16:
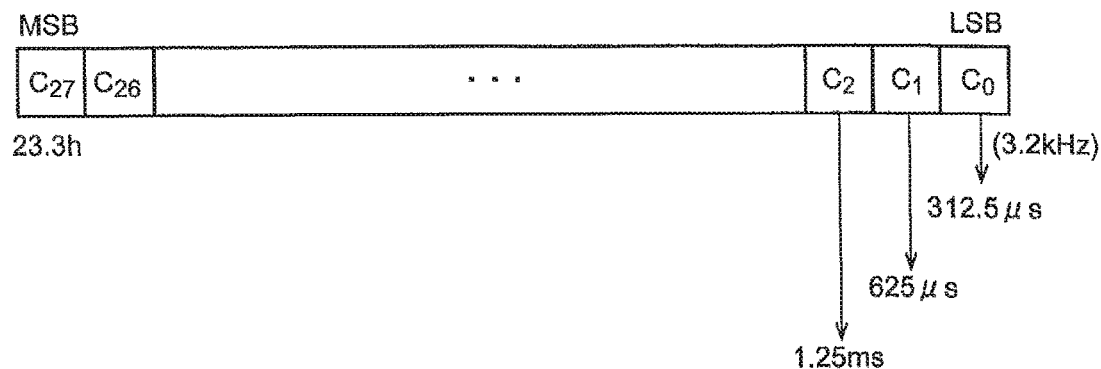
FIG. 16 is a view depicting a BT clock.

FIG. 16 depicts the BT clock. A clock counter incorporated in a BT communication apparatus generates a 28-bit BT clock whose clock rate is 3.4 KHz. Here, a slot is defined by the bit C1, and the master performs transmission operation in even-numbered slots (C1=0) and performs reception operation in odd-numbered slots (C1=1).

In the communication system 1 of the embodiment, the communication device 2 includes two communication units of a first communication unit 42 and a second communication unit 44. For example, if the second communication unit 44 performs reception operation during transmission operation of the first communication unit 42, then the transmission operation of the first communication unit 42 becomes interference with the reception operation of the second communication unit 44. Therefore, it is preferable to avoid collision of transmission and reception between the first communication unit 42 and the second communication unit 44.

Figure 17:
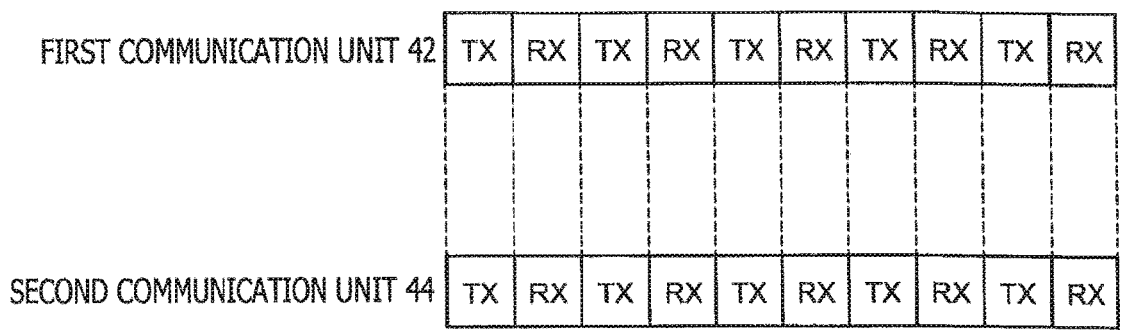
FIG. 17 is a view depicting a timing chart of transmission and reception by the first communication unit and the second communication unit.

FIG. 17 depicts a timing chart of transmission and reception in the first communication unit 42 and the second communication unit 44. In the first communication unit 42, the communication controlling unit 52 performs switching between a transmission operation and a reception operation in response to the value of a predetermined bit (C1) of the clock counter 56 (which generates a clock signal of the first communication unit having a plurality of successive bits (C0, C1 . . . CN)). Also in the second communication unit 44, the communication controlling unit 62 similarly performs switching between a transmission operation and a reception operation in response to the value of the predetermined bit (C1) of the clock counter 64 (which generates a clock signal of the second communication unit having a plurality of successive bits). Accordingly, by synchronizing the value of the predetermined bit (C1) of the clock counter 56 and the value of the predetermined bit (C1) of the clock counter 64 with each other, it is possible to synchronize the transmission operation and the reception operation of the first communication unit 42 and the second communication unit 44 with each other as depicted in FIG. 17. The predetermined bit (C1) of the clock counter 56 and the predetermined bit (C1) of the clock counter 64 are bits at the same position that is the second bit from the least significant bit (LSB).

The first communication unit 42 and the second communication unit 44 in the embodiment are formed on the same chip, and the clock counter 56 and the clock counter 64 may generate a BT clock on the basis of a clock signal of a common system clock oscillator.

The clock counter 56 supplies a counter reset signal, which is a side band signal, to the clock counter 64. The clock counter 56 outputs the counter reset signal in the case where the lowest 2 bits (C1, C0) are 0. When the counter reset signal is received, the clock counter 64 sets the lowest 2 bits (C1, C0) to 0. Consequently, the clock counter 56 and the clock counter 64 can synchronize the values of the bit C1, which defines a slot, with each other, and the communication controlling unit 52 of the first communication unit 42 and the communication controlling unit 62 of the second communication unit 44 can synchronize the transmission and reception operations with each other.

It is to be noted that the communication controlling unit 52 and the communication controlling unit 62 synchronize the transmission and reception operations with each other and preferably communicate with each other with frequencies different from each other. Since the frequency hopping pattern is determined using the BT device address of the master, The communication controlling unit 52 may determine a frequency hopping pattern using the BT device address of the first communication unit 42 as it is, and the communication controlling unit 62 may determine a frequency hopping pattern by offsetting the BT device address of the first communication unit 42 by a predetermined value. This makes it possible to make the frequencies to be used by the communication controlling unit 52 and the communication controlling unit 62 different from each other with certainty.

It is to be noted that, although the first communication unit 42 and the second communication unit 44 in the embodiment include the clock counter 56 and the clock counter 64, respectively, in a different example, a clock counter common to the first communication unit 42 and the second communication unit 44 disposed on the same chip may be provided such that a BT clock from the common clock counter is supplied to the first communication unit 42 and the second communication unit 44. As an alternative, the clock counter 56 may generate a BT clock from a clock signal of a system clock oscillator and supply the generated BT clock and a counter reset signal to the clock counter 64 to synchronize the values of the bit C1 that specifies a slot with each other. It is to be noted that, although it is presupposed in the present embodiment that the first communication unit 42 and the second communication unit 44 are disposed on the same chip, even in the case where they are disposed on different chips, the values of the bit C1 that defines a slot can be synchronized with each other by supplying a counter reset signal from the clock counter 56 to the clock counter 64.

Therefore, in example embodiments, bit synchronization of the clock counter 56 and the clock counter 64 is performed only for the low-order 2 bits (C1, C0). Each bit can define a so-called slot (or period of time) within a clock cycle defined by the succession of bits. As mentioned above, the master performs transmission operation in even-numbered slots (C1=0) and performs reception operation in odd-numbered slots (C1=1). To achieve this, it is possible that only bit C1 may be synchronized, but in example arrangements both C1 and C0 are set to 0 for counter reset. Bit C2 and higher are not affected by the counter reset. Therefore, a "given bit" may be C1 or it may refer to C0 and C1.

The present invention has been described on the basis of the embodiment. The embodiment is exemplary and it can be recognized by those skilled in the art that various modifications are possible in regard to the components or processes of the embodiment and that also such modifications remain within the scope of the present invention.

In the sequence depicted in FIG. 4, where the electronic apparatus 200 operates in the page scan mode in a state in which it is notified of apparatus ID information of the second communication unit 44 from the first communication unit 42, the electronic apparatus 200 can respond fully to a connection request from the second communication unit 44 that has the notified apparatus ID information. Even if the electronic apparatus 200 is not notified of the apparatus ID information of the second communication unit 44, it may respond to a connection request from the second communication unit 44. It is to be noted that, when the electronic apparatus 200 is notified of the apparatus ID information of the second communication unit 44, it is possible for the electronic apparatus 200 to transmit a connection request including the apparatus ID information of the second communication unit 44 to the second communication unit 44 to establish connection.

Example methods representing at least some of the above techniques will now be described with reference to schematic flowcharts provided as FIGS. 18 to 24.

Figure 18:
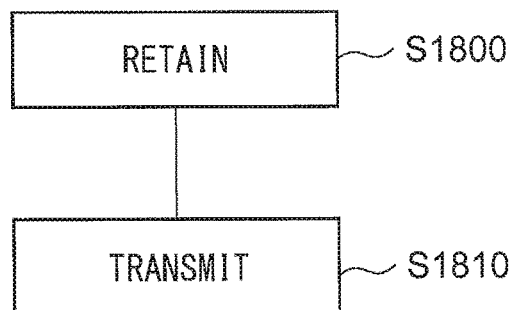
FIG. 18 is a schematic flowchart illustrating a method.

FIG. 18 is a schematic flowchart illustrating a wireless connection method for establishing wireless connection to a communication device that includes a plurality of communication units of the same type, the method comprising:

a step 1800 of retaining identification information of one of the communication units acquired by a pairing process with the communication unit; and a step 1810 of transmitting a connection request including the identification information of the one communication unit.

Figure 19:
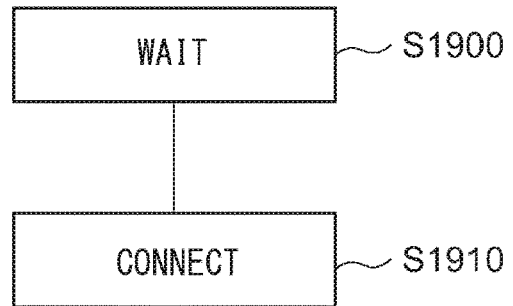
FIG. 19 is a schematic flowchart illustrating a method.

FIG. 19 is a schematic flowchart illustrating a method of operation of a communication device having a first communication unit and a second communication unit of a same type as that of the first communication unit, the communication device being wirelessly connectable to an external apparatus, the method comprising:

the first communication unit waiting (at a step 1900) for a connection request from an external apparatus; and in response to receipt of the connection request, the second communication unit wirelessly connecting (at a step 1910) to the external apparatus from which the first communication unit received a connection request.

Figure 20:
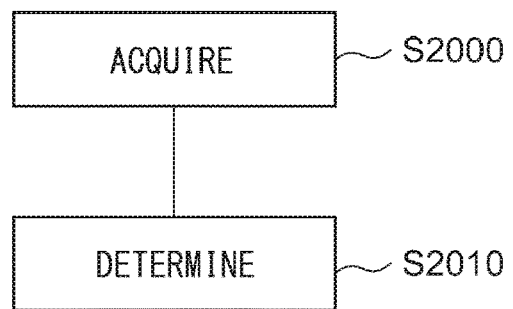
FIG. 20 is a schematic flowchart illustrating a method.

FIG. 20 is a schematic flowchart illustrating a connection destination determination method for determining a connection destination of an external apparatus in a communication device that includes a first communication unit and a second communication unit of a same type as that of the first communication unit, the method comprising:

a step 2000 of acquiring a communication situation of the first communication unit with an external apparatus and another communication situation of the second communication unit with an external apparatus; and a step 2010 of determining a connection destination of an external apparatus to the first communication unit or the second communication unit based on the acquired communication situations.

Figure 21:
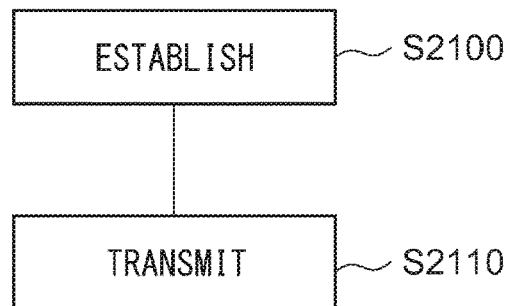
FIG. 21 is a schematic flowchart illustrating a method.

FIG. 21 is a schematic flowchart illustrating a method for wirelessly connecting a communication device including a first communication unit and a second communication unit of a same type as that of the first communication unit to an external apparatus, the first communication unit or the second communication unit carrying out:

a step 2100 of establishing wireless connection to an external apparatus; and a step 2110 of transmitting, to the external apparatus, a waiting instruction signal for instructing the external apparatus to enter a state in which the external apparatus waits for a connection request.

Figure 22:
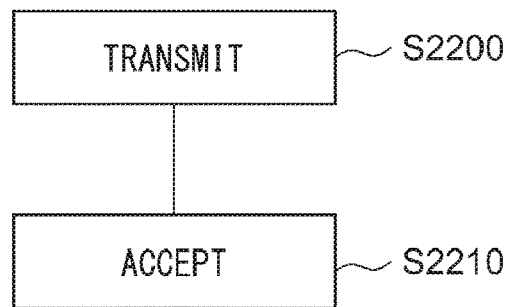
FIG. 22 is a schematic flowchart illustrating a method.

FIG. 22 is a schematic flowchart illustrating a wireless connection method for establishing wireless connection to a communication device, comprising:

a step 2200 of transmitting a connection request to the communication device; and a step 2210 of accepting, after connection to the communication device is established, an instruction to enter a state in which a connection request is waited.

Figure 23:
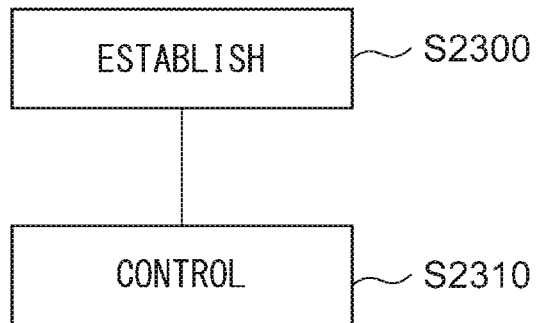
FIG. 23 is a schematic flowchart illustrating a method.

FIG. 23 is a schematic flowchart illustrating a method of operation of a communication device including a communication unit that operates as one of a master and a slave so as to control a state of the communication unit, the method comprising:

a step 2300 of establishing connection between the communication unit and an external apparatus; and a step 2310 of controlling a period during which the communication unit operates as the slave in response to a communication situation of the communication unit with a different external apparatus from the external apparatus.

Figure 24:
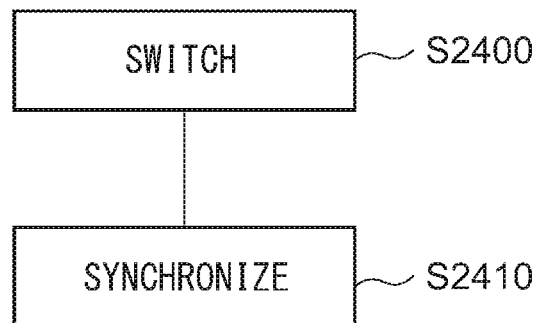
FIG. 24 is a schematic flowchart illustrating a method.

FIG. 24 is a schematic flowchart illustrating a method of operation of communication device having a first communication unit and a second communication unit of a type same as that of the first communication unit; the method comprising:

each of the first communication unit and the second communication unit performing switching (at a step 2400) between transmission operation and reception operation in response to a value of a given bit of a respective clock signal having a plurality of successive bits; and synchronizing (at a step 2410) a value of the given bit of the clock signal of the first communication unit and a value of the given bit of the clock signal of the second communication unit with each other.

Figure 25:
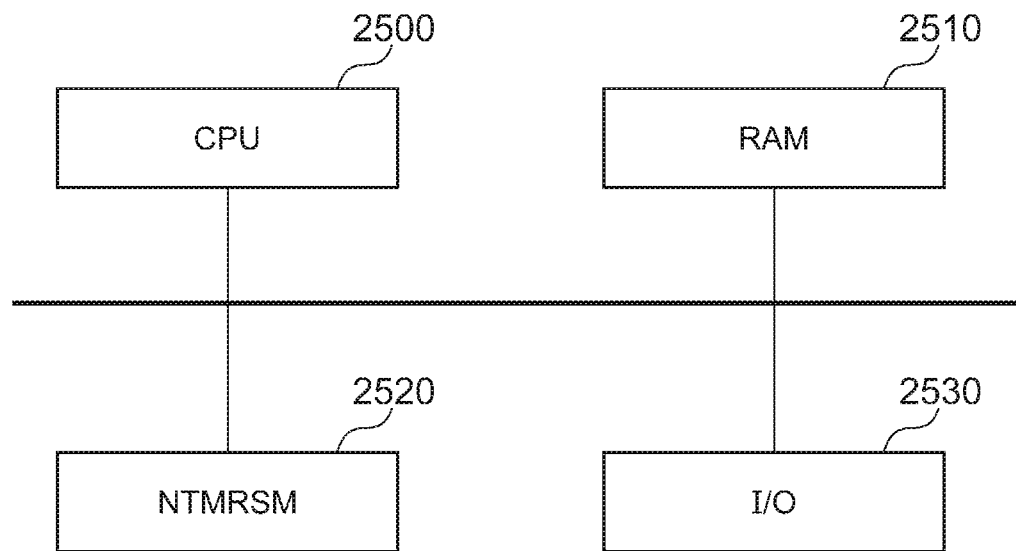
FIG. 25 schematically illustrates a computer.

FIG. 25 schematically illustrates a computer or computer processor which may be used to implement any one or more components of the communication device or the electronic apparatus discussed above. For example, control or other functions such as those provided by any one or more of the units 34, 50, 52, 54, 56, 60, 62, 64, 102, 104, 106 may be implemented by executing program instructions by such a computer. Similarly, control or other functions such as those provided by any one or more of the units 210, 212, 214, 216, 220, 222, 224 may be implemented by executing program instructions by such a computer. The computer comprises a central processing unit (CPU) 2500, a random access memory (RAM) 2510, a non-transitory machine-readable storage medium (NTMRSM) 2520 such as a read only memory, hard disk, optical disk, flash memory or the like, for example by which the program instructions are provided, and input/output (I/O) circuitry 2510, the components being interconnected by a bus arrangement 2540.

Figure 26:
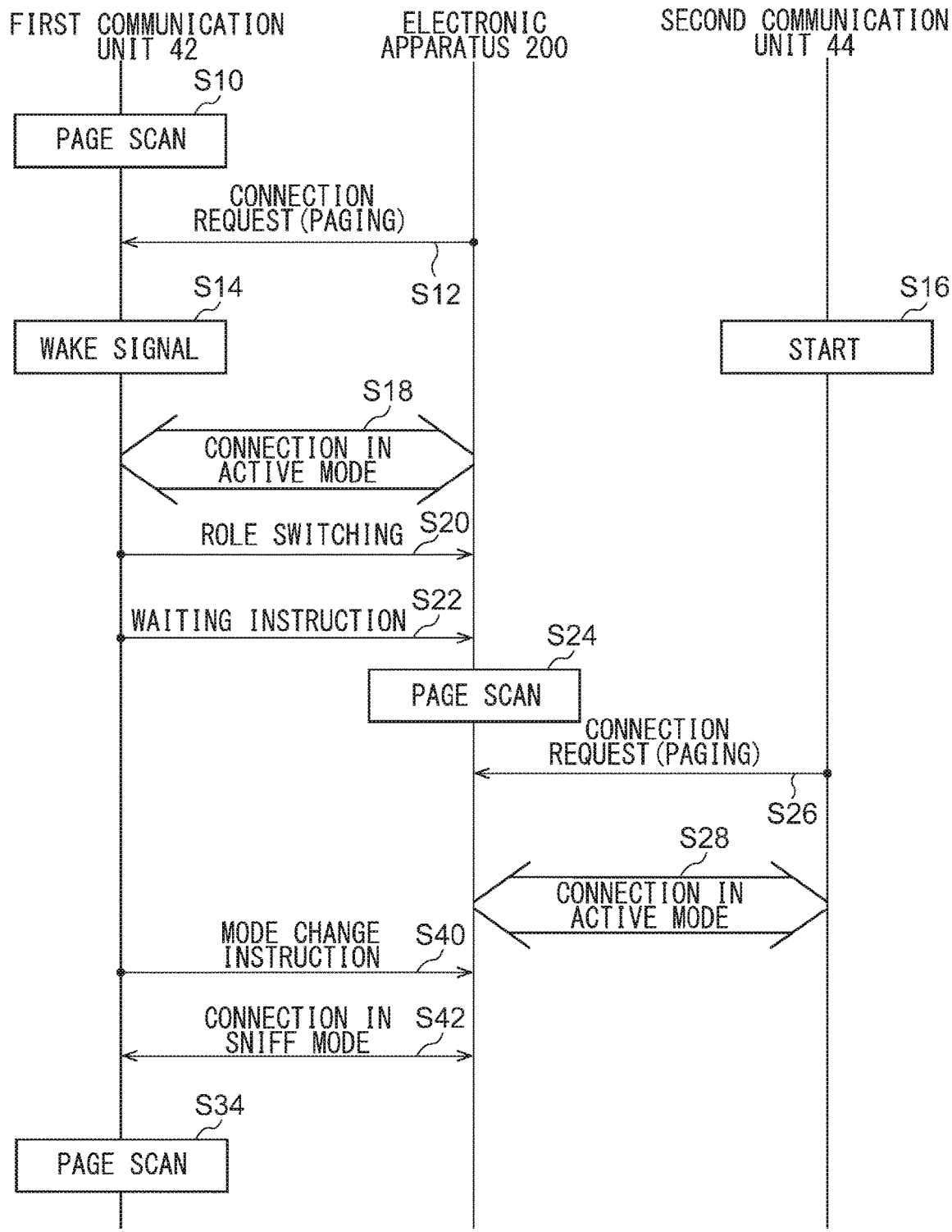
FIG. 26 is a view depicting a sequence by which the electronic apparatus and the communication device according to a variation establish wireless connection therebetween.

A description will now be given of a variation. FIG. 26 is a view depicting a sequence by which the electronic apparatus 200 and the communication device 2 according to a variation establish wireless connection therebetween. The procedures denoted by the same number in FIG. 4 and in FIG. 26 are identical or similar procedures. In the wake on BT state, the first communication unit 42 operates in a page scan mode in which it waits for a connection request from an external electronic apparatus 200 (S10). The connection processing unit 50 of the first communication unit 42 waits for a connection request (paging) from an electronic apparatus 200 included in the connectable apparatus ID list.

In the electronic apparatus 200, the connection requesting unit 212 reads out the apparatus ID information of the first communication unit 42 from the retaining unit 222 and transmits a connection request including the apparatus ID information of the first communication unit 42 to the first communication unit 42 (S12). In the first communication unit 42, when the connection processing unit 50 receives the connection request from the electronic apparatus 200 having a device ID included in the apparatus ID list, it outputs a WAKE signal to the system controller 20 in accordance with the wake on parameters (S14). When the system controller 20 receives the WAKE signal, it starts up the host block 30 and the USB module 46 to make the USB connection between the USB module 32 and the USB module 46 active.

In the control unit 34, the connection management unit 102 downloads firmware into the second communication unit 44 through the USB connection to initialize the second communication unit 44. Consequently, the second communication unit 44 is placed into a wirelessly connectable state to an external electronic apparatus 200 (S16). The connection management unit 102 executes an authentication process and an encryption process with the electronic apparatus 200 and the first communication unit 42 establishes connection to the electronic apparatus 200 in an active mode that is a data transfer mode in which data can be transferred (S18). An active mode is a connection mode in which the communication block 40 and the electronic apparatus 200 transmit and receive data to and from each other using a plurality of continuous slots. To communicate data such as voice data between the communication block 40 and the electronic apparatus 200, it is necessary for the communication block 40 and the electronic apparatus 200 to be connected to each other in the active mode.

At the point of time that a connection is established in the active mode, the electronic apparatus 200 that is the paging device is the master, and the first communication unit 42 that is the paged device is the slave. The role management unit 106 transmits a role switching instruction for switching the roles (roles) of the master and the slave to the electronic apparatus 200 through the first communication unit 42 (S20). In the electronic apparatus 200, the instruction processing unit 214 accepts the role switching instruction. The connection processing unit 50 in the first communication unit 42 and the instruction processing unit 214 execute switching of the roles of the first communication unit 42 and the electronic apparatus 200 in synchronism with each other after a predetermined interval of time after the role switching instruction is transmitted. Consequently, the electronic apparatus 200 starts operation as the slave and the first communication unit 42 of the communication device 2 starts operation as the master. After that, the first communication unit 42 instructs the electronic apparatus 200 to establish a state in which the electronic apparatus 200 waits for acceptance of a connection request (S22).

The connection management unit 102 acquires a communication situation of the first communication unit 42 with an external apparatus and a communication situation of the second communication unit 44 with an external apparatus. At the point of time of establishment of connection at S18, the first communication unit 42 is connected to one electronic apparatus 200, and the second communication unit 44 is not connected to any electronic apparatus 200.

Figure 27:
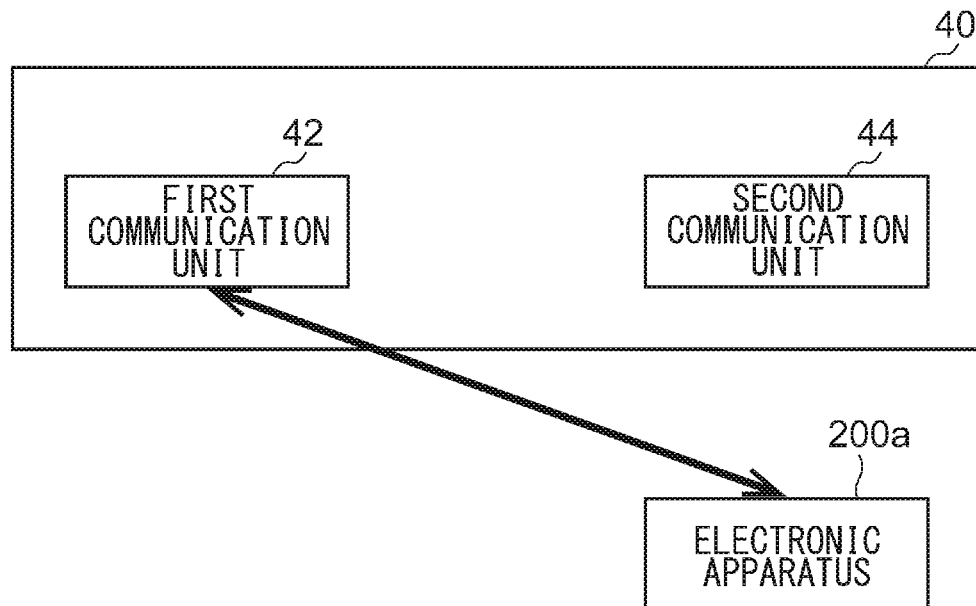
FIG. 27 depicts a state in which the first electronic apparatus is wirelessly connected to the first communication unit in the active mode.

FIG. 27 depicts a state in which the first electronic apparatus 200a is connected to the first communication unit 42 in the active mode. The connection management unit 102 may acquire the numbers of external apparatuses to which the first communication unit 42 and the second communication unit 44 are respectively connected in the active mode as the communication situations.

In the variation, the electronic apparatus 200 is connected to one of the first communication unit 42 and the second communication unit 44 in a data transfer mode in which data can be transferred and is connected to the other of the first communication unit 42 and the second communication unit 44 in a data non-transfer mode in which data is not transferred. A detailed description will follow.

In the variation, the data transfer mode is an active mode in which a data transfer period is secured. In the data transfer mode, data used in a process executed in the information processing device incorporating the communication device 2 is transmitted and/or received. In the case where the information processing device is a game device, data used to run the game or voice data for voice chats may be transmitted and received in the data transfer mode.

In the case where the electronic apparatus 200 is a peripheral such as a headset or a game controller, the electronic apparatus 200 transfers data input by the user to the communication unit in the data transfer mode, and the communication unit transfers output data for the user to the electronic apparatus 200 in the data transfer mode. The data input by the user includes, for example, voice data originated by the user or data necessary for execution of the game (application). The data necessary for execution of the game may include operation data for the controller and motion data for the controller. The output data for the user may include voice data in the game and voice data originated by a further user.

The data non-transfer mode may be a connection mode in which data cannot be transferred or may be a connection mode in which data can be transferred but is not transferred. In the data non-transfer mode, data input by the user and output data for the user are not transferred between the electronic apparatus 200 and the communication unit. In the variation, control data for the electronic apparatus 200 or state data indicating the state of the electronic apparatus 200 are transferred in the data transfer mode, but these items of data may be transferred in the non-transfer mode exceptionally.

Thus, the electronic apparatus 200 according to the variation is connected to one of the first communication unit 42 and the second communication unit 44 such that data communication is enabled and connected to the other of the first communication unit 42 and the second communication unit 44 such that data communication is not performed. Where three or more communication units are provided in the communication block 40, for example, the electronic apparatus 200 is connected to one of the communication units in the data transfer mode and connected to the other communication units in the data non-transfer mode.

In the data non-transfer mode, an extremely short period of time is defined within a communication cycle as a communication enabled period for maintaining synchronization, and the remainder of communication cycle is defined as a non-communication period. For example, the communication enabled period in the communication cycle in the data non-transfer mode may be ⅒ or shorter than the non-communication period. The data non-transfer mode of the variation may be a sniff mode in which packets for maintaining synchronization are transmitted and received by using only a predetermined number of slots (e.g., two slots) in a predetermined time interval (N slots). In the sniff mode, the N slots defining the predetermined time interval are called a sniff cycle, and N may be such that N=300. The sniff mode is a power saving connection mode used for the purpose of operating in a power saving mode and maintaining synchronization. The data non-transfer mode may be a connection mode of a format other than the sniff mode so long as it is a mode in which data is not transferred but synchronization of communication can be maintained.

The electronic apparatus 200 connected to the communication unit in the sniff mode transmits and receives packets to and from the communication unit only during the two sniff slots defined within the sniff cycle comprised of continuous 300 slots. During the 298 slots other than the two sniff slots, the electronic apparatus 200 does not perform any process for the communication unit connected in the sniff mode. In the sniff mode, the master transmits a predetermined poll packet, and the slave receiving the packet returns a null packet, completing packet communication in the sniff cycle for maintaining synchronization. In the sniff mode, communication parameters for connection are maintained so that a new paging processes or authentication process is not necessary in changing the connection mode from the sniff mode to the active mode.

The allocation processing unit 104 executes an allocation process for determining the connection destination of the external apparatus in the data transfer mode (active mode) to the first communication unit 42 or the second communication unit 44 on the basis of the communication situations of the first communication unit 42 and the second communication unit 44 acquired by the connection management unit 102. The allocation processing unit 104 preferably determines the connection destination of the external apparatus in the active mode to the first communication unit 42 or the second communication unit 44 such that the communication load with the external apparatus on the first communication unit 42 is equal to or lower than the communication load with the external apparatus on the second communication unit 44. In other words, the allocation processing unit 104 preferably makes the communication load on the first communication unit 42 having the function of waiting for a connection request from the external electronic apparatus 200 equal to or lower than the communication load on the second communication unit 44 not having that function.

The allocation processing unit 104 preferably performs an allocation process not to make the communication load on the second communication unit 44 excessively larger than the communication load on the first communication unit 42 while ensuring that the communication load on the first communication unit 42 is equal to or lower than the communication load on the second communication unit 44. For example, the allocation processing unit 104 preferably performs an allocation process to ensure that a difference between the communication load on the second communication unit 44 and the communication load on the first communication unit 42 does not exceed a predetermined threshold value on the condition that the communication load on the first communication unit 42 is equal to or lower than the communication load on the second communication unit 44.

In the variation, the first communication unit 42 and the second communication unit 44 are connected to the electronic apparatus 200 in one of the active mode and the sniff mode. The communication load carried during the connection in the sniff mode is extremely lower than the communication load carried during the connection in the active mode. In this background, the allocation processing unit 104 may determine the connection destination of the external apparatus in the active mode by disregarding the communication load during the sniff mode and determining the relative magnitudes of the communication loads based on the number of external apparatuses to which the first communication unit 42 is connected in the active mode and the number of external apparatuses to which the second communication unit 44 is connected in the active mode.

When only one electronic apparatus 200 is connected to the communication device 2 as shown in FIG. 27, the allocation processing unit 104 preferably determines the connection destination of the electronic apparatus 200 in the active mode to the second communication unit 44 to make the communication load on the first communication unit 42 lighter than the communication load on the second communication unit 44.

Thus, the communication load to be used as a reference for decision of an allocation destination by the allocation processing unit 104 may be the number of external apparatus to which each communication unit is connected in the active mode. Therefore, the allocation processing unit 104 may allocate an external apparatus to the first communication unit 42 or the second communication unit 44 in the active mode such that the number of external apparatuses to which the first communication unit 42 is connected in the active mode is equal to or smaller than the number of external apparatuses to which the second communication unit 44 is connected in the active mode.

It is to be noted that the communication load to be used as a reference may be a communication data amount of each communication unit with an external apparatus. Although the data amount of voice data in voice chat with an electronic apparatus 200 is great, the data amount of operation data of a game controller is small. Therefore, the connection management unit 102 may monitor the communication data amount between each communication unit and an electronic apparatus 200, and the allocation processing unit 104 may determine the connection destination of the electronic apparatus 200 such that the communication load on the first communication unit 42 becomes lower than the communication load on the second communication unit 44. The communication load to be used as a reference may be a communication error rate in each communication unit or may be a combination of some of them.

Alternatively, the communication load to be used as a reference may be predicted based on functions of the electronic apparatus 200 or the on/off state of the functions. For example, if a microphone is not attached to the electronic apparatus 200, it is predicted that the communication load on the electronic apparatus 200 is low, and, if a microphone is attached, on the other hand, it is predicted that the communication load on the electronic apparatus 200 is high or will become high. The connection management unit 102 may notify the allocation processing unit 104 of the availability of functions in the electronic apparatus 200 or the on/off state of the functions. The allocation processing unit 104 may determine the connection destination of the electronic apparatus 200 by predicting the communication load.

In the state shown in FIG. 27, only one electronic apparatus 200a is already connected to the communication device 2. Therefore, the allocation processing unit 104 determines to change the connection destination of the electronic apparatus 200a in the active mode from the first communication unit 42 to the second communication unit 44. The allocation processing unit 104 initiates a connection process of the already connected electronic apparatus to the second communication unit 44. Specifically, the allocation processing unit 104 causes the electronic apparatus 200a to operate in a scan mode (such as the page scan mode) and causes the second communication unit 44 to transmit a connection request to the electronic apparatus 200a. To this end, at S22, the first communication unit 42 transmits a signal (waiting instruction signal) for instructing the electronic apparatus 200a to establish a state in which the electronic apparatus 200a waits for a connection request from the second communication unit 44.

The allocation processing unit 104 notifies the first communication unit 42 and the second communication unit 44 that the connection destination of the electronic apparatus 200a in the active mode is to be switched from the first communication unit 42 to the second communication unit 44. At this time, the allocation processing unit 104 notifies the first communication unit 42 and the second communication unit 44 also of apparatus ID information (BT device address) of the electronic apparatus 200a. Consequently, the first communication unit 42 and the second communication unit 44 recognize that they are to operate such that the electronic apparatus 200a currently connected to the first communication unit 42 in the active mode is connected to the second communication unit 44 in the active mode and to the first communication unit 42 in the sniff mode.

In the first communication unit 42, the connection processing unit 50 transmits a waiting instruction signal to the electronic apparatus 200a (S22). The waiting instruction signal may include identification information of an apparatus (for example, communication unit) from which a connection request is to be transmitted, in the present example, apparatus ID information of the second communication unit 44. In the electronic apparatus 200a, the instruction processing unit 214 receives a waiting instruction signal and accepts an instruction to enter a state in which it waits for a connection request from the second communication unit 44. Consequently, while the instruction processing unit 214 maintains the connection to the first communication unit 42 in the active mode, the request processing unit 216 operates in the page scan mode for waiting for a connection request from the second communication unit 44 (S24).

At this time, the instruction processing unit 214 operates so as to alternately switch a communication period (first period) for communication with the first communication unit 42 and a scan period (second period) for waiting for a connection request from the second communication unit 44. The connection processing unit 50 may place timing information that defines alternate switching between the first period and the second period into the waiting instruction signal such that the instruction processing unit 214 alternately and periodically switches between the communication period for communication with the first communication unit 42 and the scan period for waiting for a connection request from the second communication unit 44 in accordance with the timing information included in the waiting instruction signal.

It is to be noted that the connection processing unit 50 preferably sets timing information in response to the connection situation of the electronic apparatus 200 and the communication device 2 in the active mode. At the point of time of S22 in FIG. 26, the electronic apparatus 200a is in a stage in which it performs a new connection process with the communication device 2 and does not yet start data communication of voice data or the like with the first communication unit 42. Therefore, the connection processing unit 50 sets timing information TI1 such that the electronic apparatus 200a can quickly establish wireless connection with the second communication unit 44. For example, the connection processing unit 50 may set the timing information TI1 indicating that the second period is longer than the first period.

In the page scan mode carried out within a scan period (second period), the request processing unit 216 waits for a connection request from the second communication unit 44 that has the apparatus ID information included in the waiting instruction signal. In the second communication unit 44, the connection processing unit 60 transmits a connection request including the apparatus ID information of the electronic apparatus 200a to the electronic apparatus 200a (S26). If the request processing unit 216 accepts the connection request, then a connection process including an authentication process and an encryption process is carried out between the request processing unit 216 and the connection processing unit 60. Consequently, the second communication unit 44 is connected to the electronic apparatus 200 in the active mode (S28).

Figure 28:
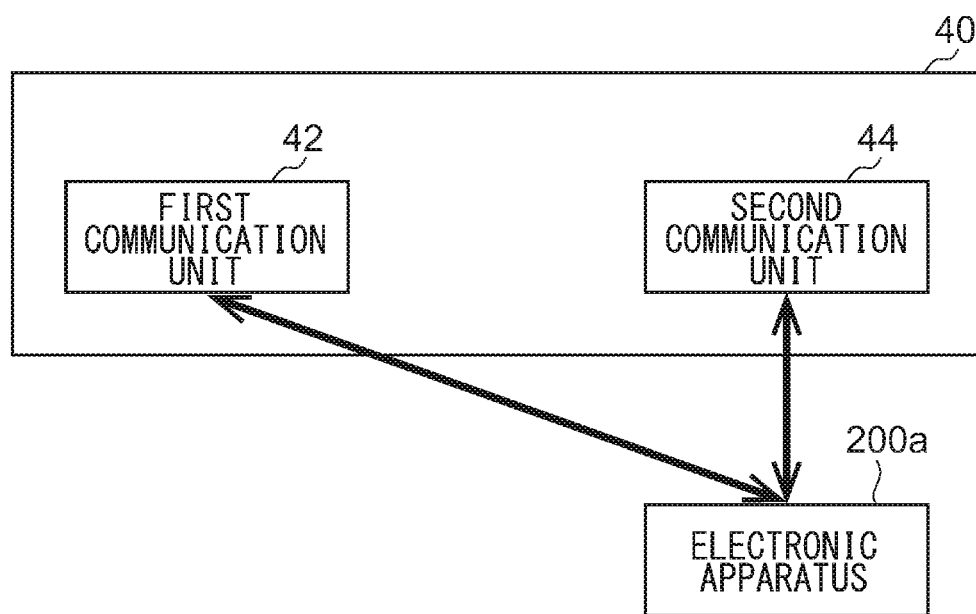
FIG. 28 depicts a state in which the first electronic apparatus is connected to the first communication unit and the second communication unit in the active mode.

FIG. 28 depicts a state in which the first electronic apparatus 200a is connected to the first communication unit 42 and the second communication unit 44 in the active mode. If the connection management unit 102 detects that the second communication unit 44 and the electronic apparatus 200a are connected, then it instructs the first communication unit 42 to change the connection mode for connection to the electronic apparatus 200 a to the sniff mode. Receiving this instruction, the connection processing unit 50 transmits a change request to the electronic apparatus 200 to change the connection mode (S40). It is to be noted that the mode change request may be transmitted from the electronic apparatus 200 to the first communication unit 42. Thereafter, the connection mode between the first communication unit 42 and the electronic apparatus 200a is changed to the sniff mode (S42). The first communication unit 42 then operates in a page scan mode for waiting for a connection request from an external electronic apparatus 200 (S34) and waits for a connection request (paging) from an electronic apparatus 200 included in the connectable apparatus ID list.

Figure 29:
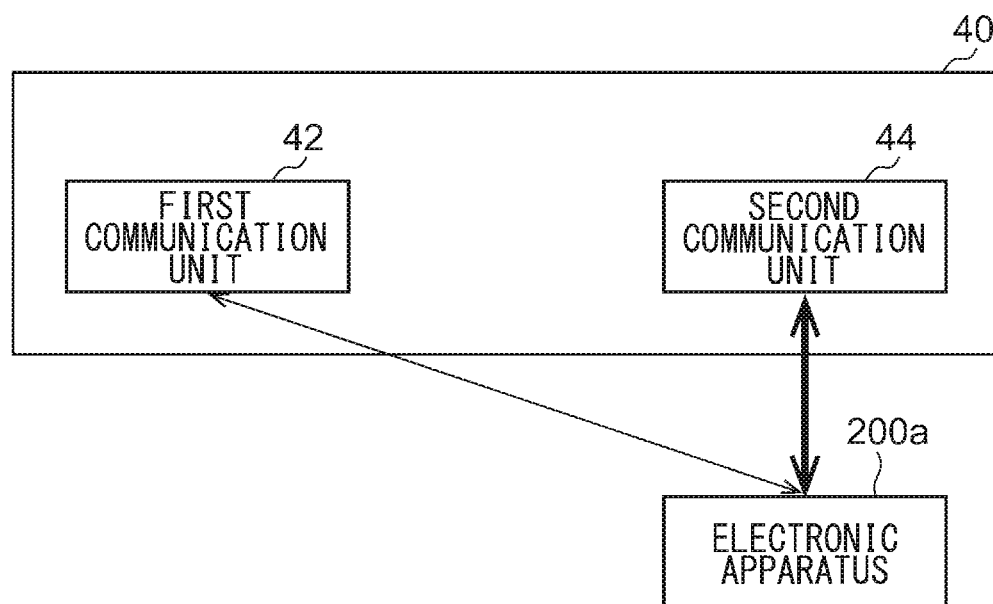
FIG. 29 depicts a state in which the first electronic apparatus is wirelessly connected to the second communication unit and wirelessly connected to the first communication unit in the sniff mode.

The procedure when a first electronic apparatus 200a establishes connection to the communication device 2 is described above. In the following, a procedure when second and succeeding electronic apparatuses 200 establish connection to the communication device 2 is described. FIG. 29 depicts a state in which the first electronic apparatus 200a is wirelessly connected to the second communication unit 44 in the active mode and wirelessly connected to the first communication unit 42 in the sniff mode in accordance with the wireless connection sequence depicted in FIG. 26.

Figure 30:
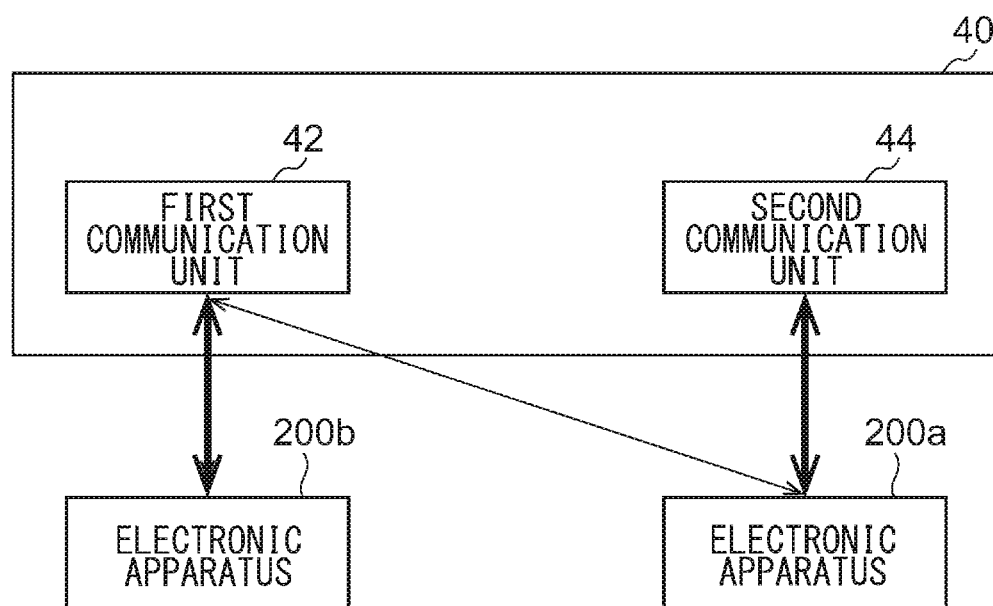
FIG. 30 depicts a state in which the second electronic apparatus is wirelessly connected to the first communication unit in the active mode.

FIG. 30 depicts a state in which the second electronic apparatus 200b is wirelessly connected to the first communication unit 42 in the active mode. The electronic apparatus 200b transmits a connection request to the first communication unit 42 to establish connection to the first communication unit 42 in the active mode.

The connection management unit 102 acquires a communication situation of the first communication unit 42 with an external apparatus and a communication situation of the second communication unit 44 with an external apparatus. In the connection state depicted in FIG. 30, the first communication unit 42 is connected to one electronic apparatus 200b in the active mode and the second communication unit 44 is connected to one electronic apparatus 200a in the active mode. The connection management unit 102 acquires the numbers of electronic apparatuses 200 to which the first communication unit 42 and the second communication unit 44 are respectively connected in the active mode as the communication situations. The allocation processing unit 104 executes a process for determining the connection destination of the electronic apparatus 200b in the active mode to the first communication unit 42 or the second communication unit 44 on the basis of the numbers of electronic apparatus 200 to which the first communication unit 42 and the second communication unit 44 are respectively connected in the active mode.

The allocation processing unit 104 determines the connection destination of the newly connected electronic apparatus 200 in the active mode to the first communication unit 42 or the second communication unit 44 such that the communication load with the external apparatus on the first communication unit 42 is equal to or lower than the communication load with the external apparatus on the second communication unit 44. In the state in which the second electronic apparatus 200b establishes connection to the first communication unit 42 in the active mode (state depicted in FIG. 30), the first communication unit 42 is connected to one electronic apparatus 200b in the active mode and the second communication unit 44 is connected to one electronic apparatus 200a in the active mode, and the communication loads on the first communication unit 42 and the second communication unit 44 are equal to each other. Therefore, the allocation processing unit 104 determines that there is no problem in that the connection destination of the electronic apparatus 200b in the active mode is the first communication unit 42.

In this way, the second electronic apparatus 200b is determined to be wirelessly connected to the first communication unit 42 in the active mode and wirelessly connected to the second communication unit 44 in the sniff mode. Before being connecting to the second communication unit 44 in the sniff mode, the electronic apparatus 200b is connected to the second communication unit 44 in the active mode through the steps of S24, S26, and S28 shown in FIG. 26.

Figure 31:
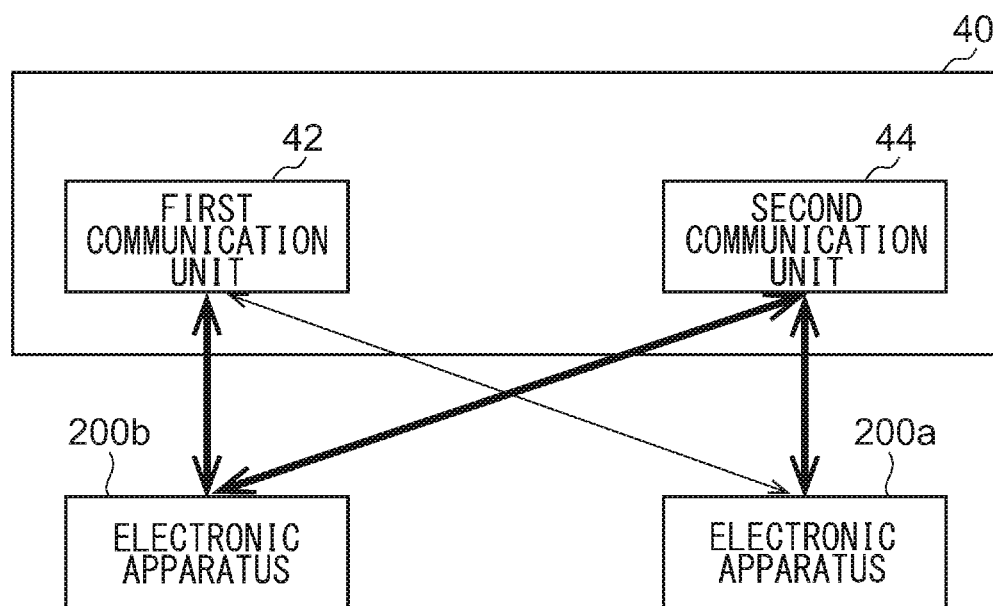
FIG. 31 depicts a state in which the second electronic apparatus is connected to the first communication unit and the second communication unit in the active mode.

FIG. 31 depicts a state in which the second electronic apparatus 200b is connected to the first communication unit 42 and the second communication unit 44 in the active mode. If the connection management unit 102 detects that the second communication unit 44 and the electronic apparatus 200a are connected in the active mode, then it instructs the second communication unit 44 to change the connection mode for connection to the electronic apparatus 200b to the sniff mode. Receiving this instruction, the connection processing unit 60 transmits a change request to the electronic apparatus 200 to change the connection mode. It is to be noted that the mode change request may be transmitted from the electronic apparatus 200 to the second communication unit 44. Thereafter, the connection mode between the second communication unit 44 and the electronic apparatus 200b is changed to the sniff mode.

Figure 32:
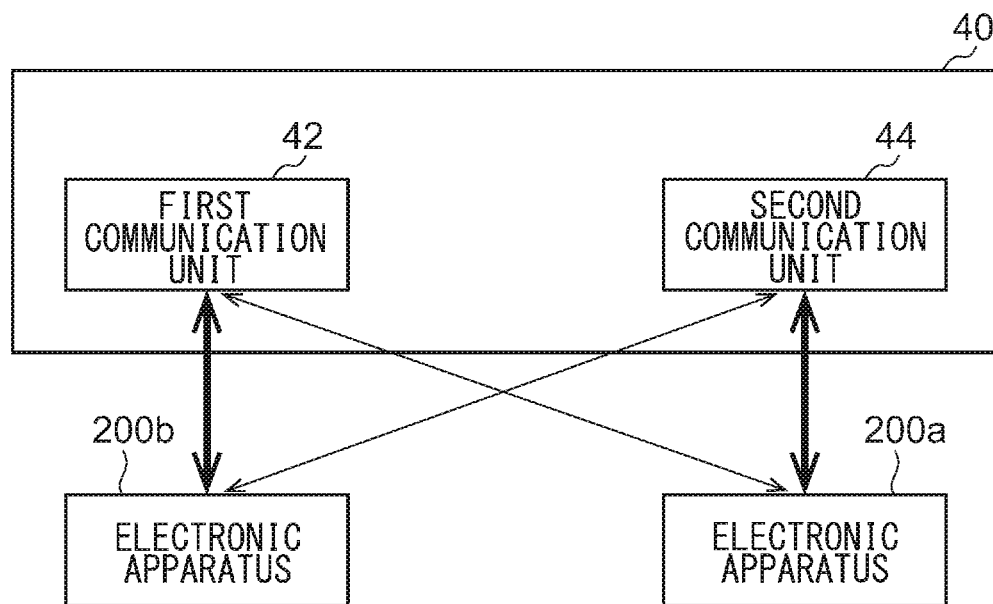
FIG. 32 depicts a state in which the second electronic apparatus is wirelessly connected to the first communication unit in the active mode and wirelessly connected to the second communication unit in the sniff mode.

FIG. 32 depicts a state in which the connection mode between the second communication unit 44 and the electronic apparatus 200b is changed to the sniff mode. Thus, in the variation, the control unit 34 connects one of the first communication unit 42 and the second communication unit 44 to the electronic apparatus 200 in the active mode in which data can be transferred and connects the other of the first communication unit 42 and the second communication unit 44 to the electronic apparatus 200 in the sniff mode in which data is not transferred. In other words, the electronic apparatus 200 is connected to the first communication unit 42 in the active mode in which data can be transferred and is connected to the second communication unit 44 in the sniff mode having a shorter communication enabled period than that of the active mode and not used to transfer data. When the allocation processing unit 104 changes the destination of connection of the electronic apparatus 200 in the active mode in response to, for example, a change of the connection environment, the process of changing the destination of connection in the active mode can be instantaneously executed without performing a new paging process or authentication process because the electronic apparatus 200 has already been connected in the sniff mode to the communication unit to which the connection is switched.

Figure 33:
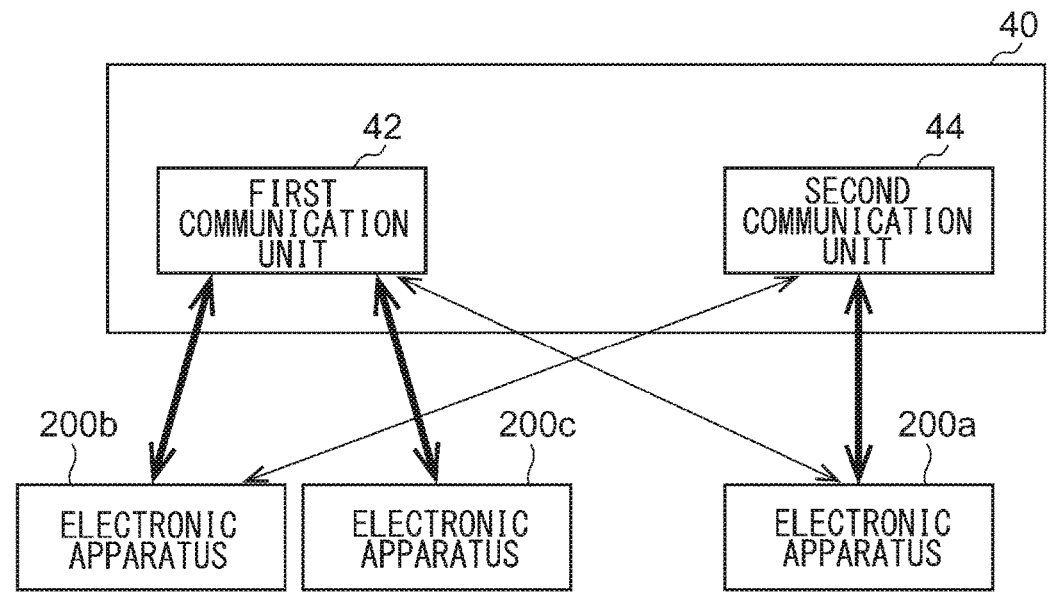
FIG. 33 depicts a state in which the third electronic apparatus is wirelessly connected to the first communication unit in the active mode.

FIG. 33 depicts a state in which the third electronic apparatus 200c is wirelessly connected to the first communication unit 42. The electronic apparatus 200c transmits a connection request to the first communication unit 42 to establish connection to the first communication unit 42 in the active mode.

The connection management unit 102 acquires the number of external apparatuses connected to the first communication unit 42 in the active mode and the number of external apparatuses connected to the second communication unit 44 in the active mode. In the connection state depicted in FIG. 33, the first communication unit 42 is connected to two electronic apparatuses 200b and 200c in the active mode and the second communication unit 44 is connected to one electronic apparatus 200a in the active mode. The allocation processing unit 104 determines the destination of connection in the active mode of the electronic apparatus 200c, to which connection is established newly, to be the first communication unit 42 or the second communication unit 44 such that the number of external apparatuses connected to the first communication unit 42 in the active mode becomes equal to or smaller than the number of external apparatuses connected to the second communication unit 44 in the active mode. In the state in which the third electronic apparatus 200c establishes connection to the first communication unit 42 (state depicted in FIG. 33), the number of external apparatuses connected to the first communication unit 42 in the active mode is greater than the number of external apparatuses connected to the second communication unit 44 in the active mode. Therefore, the allocation processing unit 104 determines that the connection destination of the electronic apparatus 200c in the active mode is the second communication unit 44 and accordingly determines to change the connection destination of the electronic apparatus 200c in the active mode from the first communication unit 42 to the second communication unit 44.

Figure 34:
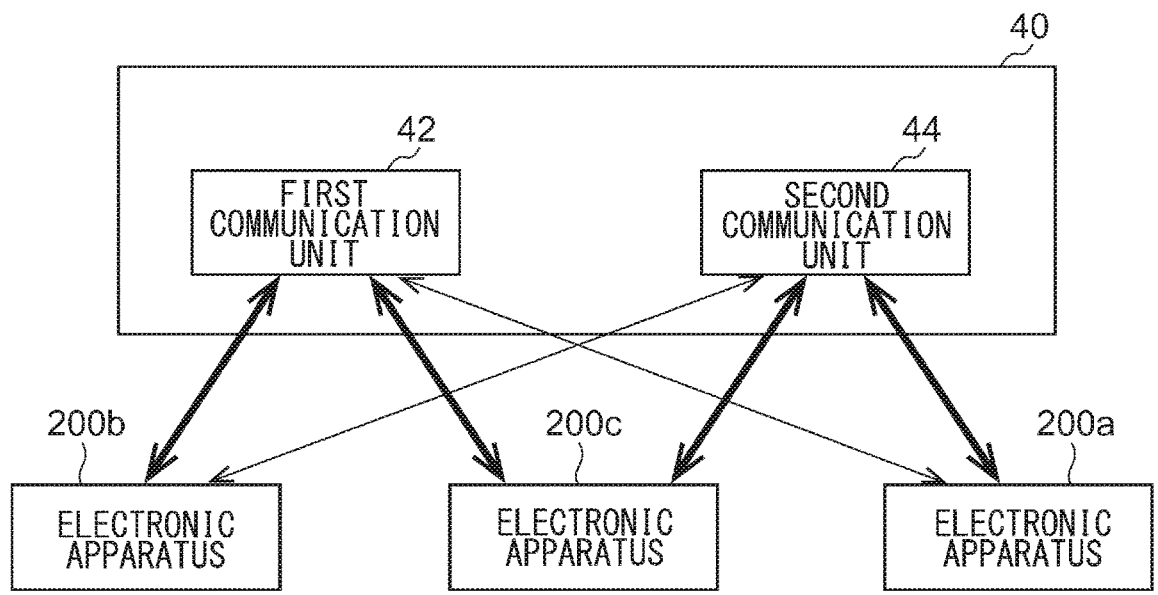
FIG. 34 depicts a state in which the third electronic apparatus is connected to the first communication unit and the second communication unit simultaneously in the active mode.

FIG. 34 depicts a state in which the electronic apparatus 200c is connected to the first communication unit 42 and the second communication unit 44 simultaneously in the active mode. The first communication unit 42 in the connection state shown in FIG. 33 transmits a waiting instruction signal to the electronic apparatus 200c, and while the electronic apparatus 200c maintains the connection to the first communication unit 42 in the active mode, it operates in the page scan mode in which it waits for a connection request from the second communication unit 44. The electronic apparatus 200c receives a connection request from the second communication unit 44 and establishes connection to the second communication unit 44 in the active mode. FIG. 34 depicts this state.

Figure 35:
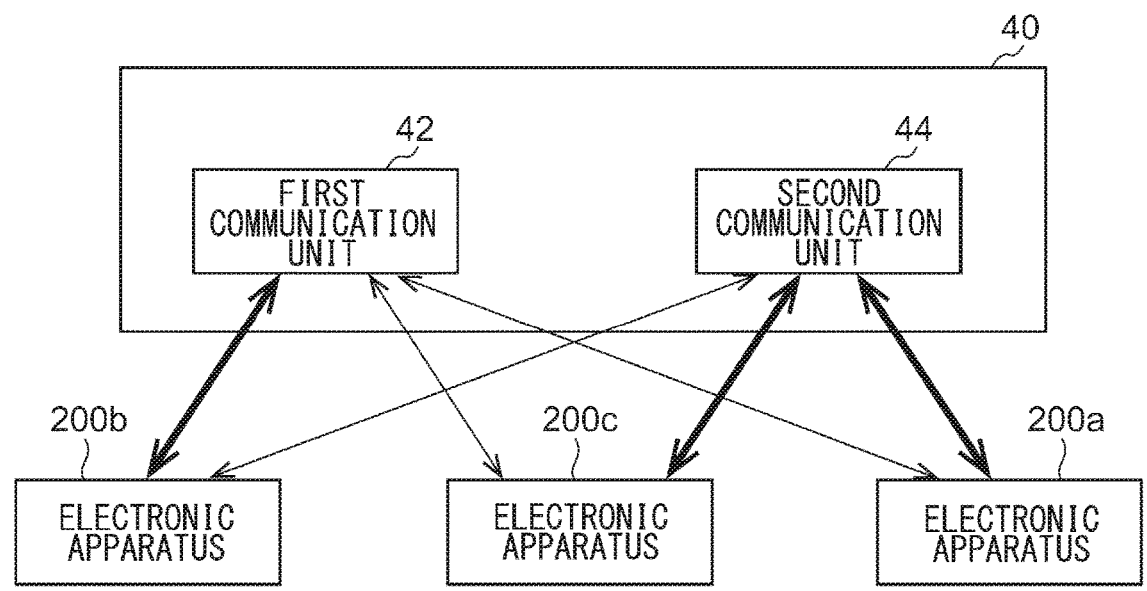
FIG. 35 depicts a state in which the third electronic apparatus is wirelessly connected to the second communication unit in the active mode and wirelessly connected to the first communication unit in the sniff mode.

FIG. 35 shows a state in which the connection between the electronic apparatus 200c and the first communication unit 42 is changed to the sniff mode. The connection management unit 102 instructs the first communication unit 42 to change the mode of connection with the electronic apparatus 200c to the sniff mode. Receiving this instruction, the connection processing unit 50 transmits a change request to the electronic apparatus 200c to change the connection mode. Thereafter, the connection mode between the first communication unit 42 and the electronic apparatus 200c is changed to the sniff mode.

Figure 36:
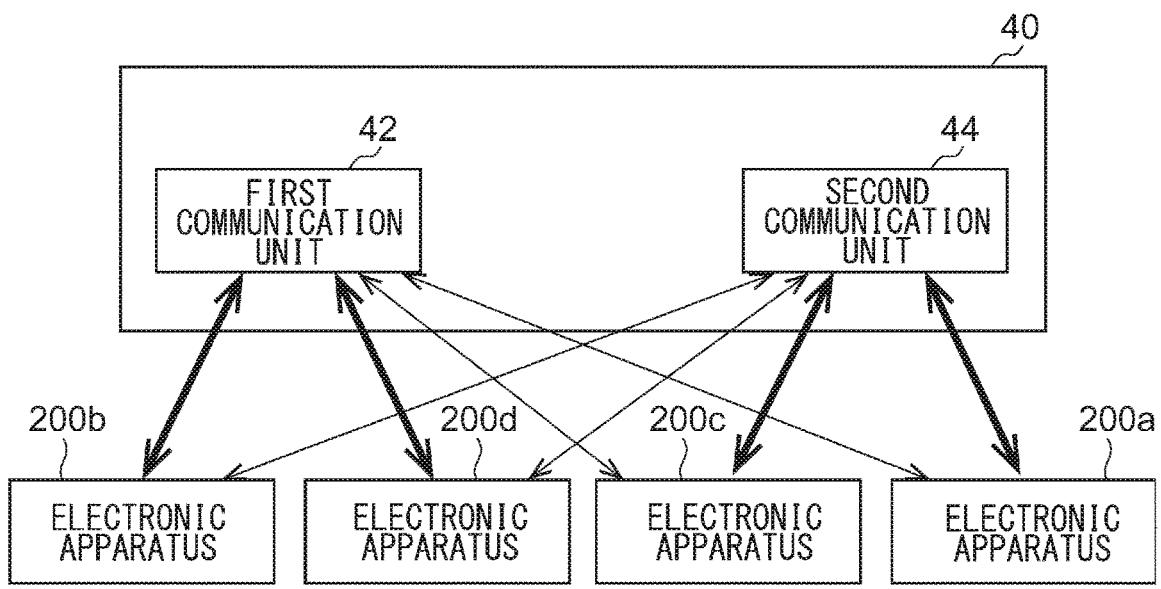
FIG. 36 depicts a state in which the fourth electronic apparatus is wirelessly connected to the first communication unit in the active mode and wirelessly connected to the second communication unit in the sniff mode.

FIG. 36 shows a state in which the fourth electronic apparatus 200d is connected to the communication block 40. The electronic apparatus 200d is wirelessly connected to the first communication unit 42 in the active mode and wirelessly connected to the second communication unit 44 in the sniff mode.

Figure 37:
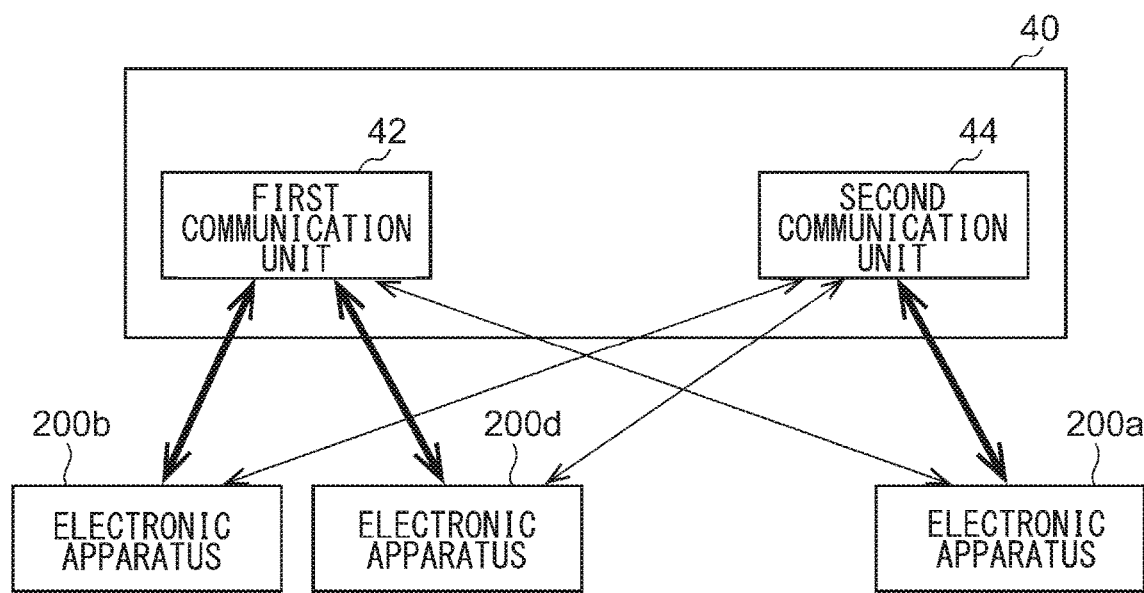
FIG. 37 depicts a state in which the third electronic apparatus is disconnected from the communication block.

FIG. 37 depicts a state in which the third electronic apparatus 200c is disconnected from the communication block 40. For example, if the user of the electronic apparatus 200c ends the game play and logs out from the device main body 3, then the connection between the electronic apparatus 200c and the communication block 40 is cancelled.

After the connection between the electronic apparatus 200c and the communication device 2 is cancelled, the connection management unit 102 acquires the number of external apparatuses connected to the first communication unit 42 in the active mode and the number of external apparatuses connected to the second communication unit 44 in the active mode. In the connection state depicted in FIG. 37, the first communication unit 42 is connected to the two electronic apparatuses 200b and 200d and the second communication unit 44 is connected to the one electronic apparatus 200a in the active mode. The allocation processing unit 104 executes an allocation process, triggered by the termination of wireless connection with the electronic apparatus 200c connected so far. In particular, the allocation processing unit 104 changes the connection destination of the electronic apparatus 200d in the active mode such that the number of external apparatuses connected to the first communication unit 42 in the active mode becomes equal to or smaller than the number of external apparatuses connected to the second communication unit 44 in the active mode. In the state depicted in FIG. 37, since the number of external apparatuses connected to the first communication unit 42 in the active mode is greater than the number of external apparatuses connected to the second communication unit 44 in the active mode, the allocation processing unit 104 determines to change the connection destination of the electronic apparatus 200d in the active mode from the first communication unit 42 to the second communication unit 44.

Figure 38:
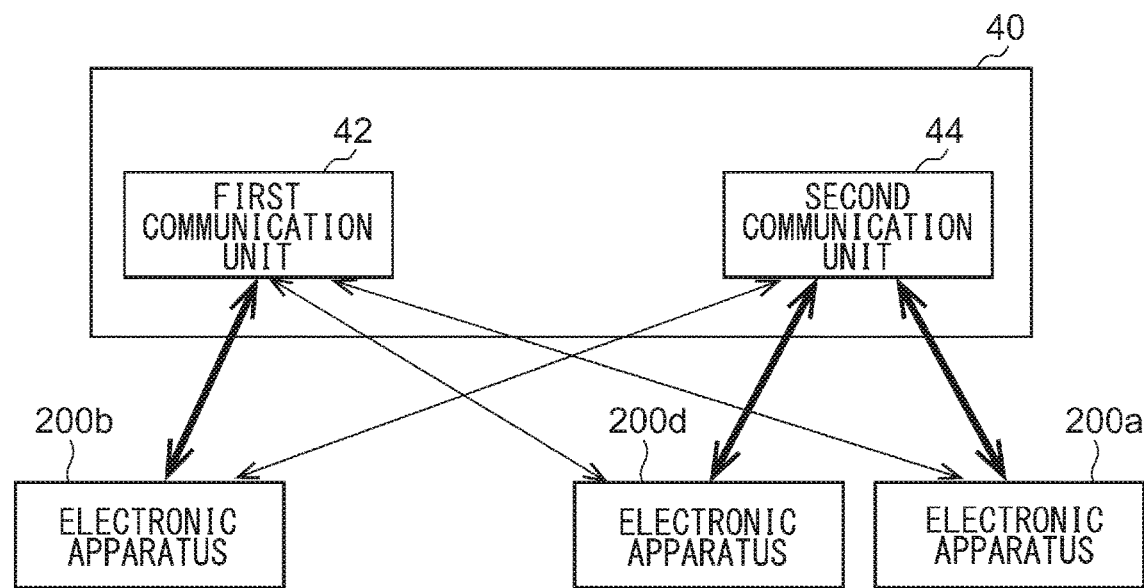
FIG. 38 shows a state in which the fourth electronic apparatus is wirelessly connected to the second communication unit in the active mode and wirelessly connected to the first communication unit in the sniff mode.

FIG. 38 shows a state in which the electronic apparatus 200d is connected to the second communication unit 44 in the active mode and connected to the first communication unit 42 in the sniff mode. In the variation, a paging process or an authentication process, which is required in the embodiment, is not necessary when the connection destination in the active mode is switched. Consequently, data communication between the electronic apparatus 200 and the communication device 2 is suitably maintained.

In this process, the control unit 34 changes the connection in the sniff mode between the electronic apparatus 200d and the second communication unit 44 to the connection in the active mode and then changes the connection in the active mode between the electronic apparatus 200d and the first communication unit 42 to the connection in the sniff mode. By following the procedure described above, data communication between the electronic apparatus 200d and the communication device 2 can be suitably maintained without being interrupted.

In the variation, when the connection between one of the first communication unit 42 and the second communication unit 44 and the electronic apparatus 200 is canceled, the control unit 34 may cancel the connection between the other of the first communication unit 42 and the second communication unit 44 and the electronic apparatus 200. For example, the connection management unit 102 determines to cancel the connection with the electronic apparatus 200 when a duration of disconnection exceeds a predetermined period of time. By ensuring that, when the connection with one is determined to be canceled, the connection with the other is canceled, connection with the electronic apparatus 200 can be managed easily.

It is noted that while various techniques have been described individually for clarity of the description, an embodiment may employ any one or more of the techniques discussed above such that the various techniques are combinable in any permutation.

INDUSTRIAL APPLICABILITY

The present invention is applicable to a wireless communication technology.

REFERENCE SIGNS LIST

1 . . . Communication system, 2 . . . Communication device, 34 . . . Control unit, 40 . . . Communication block, 42 . . . First communication unit, 44 . . . Second communication unit, 50 . . . Connection processing unit, 52 . . . Communication controlling unit, 54 . . .

Retaining unit, 56 ... Clock counter, 60 ... Connection processing unit, 62 ... Communication controlling unit, 64 ... Clock counter, 102 ... Connection management unit, 104 ... Allocation processing unit, 106 ... Role management unit, 200 ... Electronic apparatus, 210 ... Connection processing unit, 212 ... Connection requesting unit, 214 ... Instruction processing unit, 216 ... Request processing unit, 220 ... Communication controlling unit, 222 ... Retaining unit, 224 ... Clock counter.

What is claimed is:

1. A communication device that is wirelessly connectable to an external apparatus, the communication device comprising:
a first communication unit;
a second communication unit of a same type as that of the first communication unit; and
a control unit operating to control the first communication unit and the second communication unit, wherein
the control unit operates to acquire a communication situation of the first communication unit with external apparatus and another communication situation of the second communication unit with external apparatus; and
the control unit operates to execute an allocation process for determining a connection destination of an external apparatus in a data transfer mode to the first communication unit or the second communication unit based on the communication situations,
wherein the control unit operates to execute the allocation process such that a communication load with external apparatus on the first communication unit is equal to or lower than a communication load with external apparatus on the second communication unit.

2. The communication device according to claim 1, wherein the control unit operates to acquire a number of external apparatus to which each of the first and second communication units is connected in the data transfer mode.

3. The communication device according to claim 1, wherein the control unit operates to execute the allocation process for an external apparatus already connected to the communication device.

4. The communication device according to claim 1, wherein the control unit operates to execute the allocation process in response to a detection that wireless connection to an external apparatus in the connected state ends.

5. The communication device according to claim 1, wherein the control unit operates to execute the allocation process for an external apparatus to which connection is newly established.

6. A connection destination determination method for determining a connection destination of an external apparatus in a data transfer mode in a communication device that includes a first communication unit and a second communication unit of a same type as that of the first communication unit, the method comprising:
acquiring a communication situation of the first communication unit with an external apparatus and another communication situation of the second communication unit with an external apparatus; and
determining a connection destination of an external apparatus in the data transfer mode to the first communication unit or the second communication unit based on the acquired communication situations,
wherein the acquiring includes executing the allocation process such that a communication load with external apparatus on the first communication unit is equal to or lower than a communication load with external apparatus on the second communication unit.

7. A non-transitory, computer readable storage medium containing a program comprising computer-executable instructions, which when executed by a computer, which is provided in a communication device including a first communication unit and a second communication unit of a same type as that of the first communication unit, cause the computer to carry out actions, comprising:
acquiring a communication situation with an external apparatus in the first communication unit and another communication situation with an external apparatus in the second communication unit; and
determining a connection destination of an external apparatus in a data transfer mode to the first communication unit or the second communication unit based on the communication situations,
wherein the acquiring includes executing the allocation process such that a communication load with external apparatus on the first communication unit is equal to or lower than a communication load with external apparatus on the second communication unit.

8. A communication device that is wirelessly connectable to an external apparatus, the communication device comprising:
a first communication unit;
a second communication unit of a same type as that of the first communication unit; and
a control unit operates to control the first communication unit and the second communication unit, wherein
the control unit operates to connect one of the first communication unit and the second communication unit to the external apparatus in a data transfer mode in which data can be transferred and connect the other of the first communication unit and the second communication unit to the external apparatus in a data non-transfer mode in which data is not transferred,
wherein the control unit operates to execute an allocation process such that a communication load with external apparatus on the first communication unit is equal to or lower than a communication load with external apparatus on the second communication unit.

9. The communication device according to claim 8, wherein the control unit changes connection in the data non-transfer mode between the other of the first communication unit and the second communication unit and the external apparatus to connection in the data transfer mode and then changes connection in the data transfer mode between the one of the first communication unit and the second communication unit and the external apparatus to connection in the data non-transfer mode.

10. The communication device according to claim 8, wherein when the connection between the other of the first communication unit and the second communication unit and the external apparatus is canceled, the control unit cancels the connection between the one of the first communication unit and the second communication unit and the external apparatus.

11. A method for wirelessly connecting a communication device including a first communication unit and a second communication unit of a same type as that of the first communication unit to an external apparatus, the method comprising:
connecting one of the first communication unit and the second communication unit to the external apparatus in a data transfer mode in which data can be transferred;

a step of connecting the other of the first communication unit and the second communication unit to the external apparatus in a data non-transfer mode in which data is not transferred; and executing an allocation process for determining a connection destination of an external apparatus in a data transfer mode to the first communication unit or the second communication unit based on the communication situations, including executing the allocation process such that a communication load with external apparatus on the first communication unit is equal to or lower than a communication load with external apparatus on the second communication unit.

12. A non-transitory, computer readable storage medium containing a program comprising computer-executable instructions, which when executed by a computer, which is provided in a communication device including a first communication unit and a second communication unit of a same type as that of the first communication unit, cause the computer to carry out actions, comprising:

connecting one of the first communication unit and the second communication unit to the external apparatus in a data transfer mode in which data can be transferred;

connecting the other of the first communication unit and the second communication unit to the external apparatus in a data non-transfer mode in which data is not transferred; and executing an allocation process for determining a connection destination of an external apparatus in a data transfer mode to the first communication unit or the second communication unit based on the communication situations, including executing the allocation process such that a communication load with external apparatus on the first communication unit is equal to or lower than a communication load with external apparatus on the second communication unit.

* * * * *